(12) United States Patent
Kanda et al.

(10) Patent No.: US 9,406,249 B2
(45) Date of Patent: Aug. 2, 2016

(54) OPTOELECTRONIC DEVICE

(71) Applicant: SAMSUNG DISPLAY CO., LTD., Yongin-City, Gyeonggi-Do (KR)

(72) Inventors: Eiji Kanda, Yokohama (JP); Takeshi Okuno, Yokohama (JP); Masayuki Kumeta, Yokohama (JP); Daisuke Kawae, Yokohama (JP); Ryo Ishii, Yokohama (JP); Naoaki Komiya, Yokohama (JP)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 153 days.

(21) Appl. No.: 14/471,277

(22) Filed: Aug. 28, 2014

(65) Prior Publication Data

US 2015/0061537 A1 Mar. 5, 2015

(30) Foreign Application Priority Data

Aug. 29, 2013 (JP) ................................ 2013-178372

(51) Int. Cl.
| | |
|---|---|
| G09G 3/32 | (2016.01) |
| G09G 3/30 | (2006.01) |
| H05B 33/08 | (2006.01) |
| G09G 3/00 | (2006.01) |

(52) U.S. Cl.
CPC .. *G09G 3/00* (2013.01); *Y02B 20/36* (2013.01)

(58) Field of Classification Search
CPC ..... G09G 3/3233; G09G 3/32; G09G 3/3258; G09G 2300/0866; G09G 2320/0233; H05B 33/08

USPC ............................... 315/291; 345/211, 76, 77
See application file for complete search history.

(56) References Cited

U.S. PATENT DOCUMENTS

| | | | |
|---|---|---|---|
| 7,843,442 B2 * | 11/2010 | Choi | G09G 3/3233 327/94 |
| 2007/0040769 A1 | 2/2007 | Tai et al. | |
| 2011/0084947 A1 * | 4/2011 | Chung | G09G 3/3233 345/211 |
| 2012/0306840 A1 | 12/2012 | Han | |

FOREIGN PATENT DOCUMENTS

| | | |
|---|---|---|
| EP | 2525348 A2 | 11/2012 |
| EP | 2581899 A2 | 4/2013 |
| JP | 11-272233 | 10/1999 |
| JP | 2010-128491 | 6/2010 |
| JP | 2011-002845 | 1/2011 |
| JP | 2011-034038 | 2/2011 |
| JP | 2012-208274 | 10/2012 |

* cited by examiner

*Primary Examiner* — Daniel D Chang
(74) *Attorney, Agent, or Firm* — Lee & Morse, P.C.

(57) ABSTRACT

An optoelectronic device includes a driving transistor, a correction transistor, and a control circuit. The driving transistor adjusts a first current from a power supply based on a voltage stored in a first capacitor. The driving transistor supplies the adjusted first current to the light-emitting element. The correction transistor is electrically connected on a path of a second current flowing from the power supply to the first capacitor, and adjusts the second current based on a voltage stored in a second capacitor. The control circuit controls the second capacitor to store a gray scale voltage while the first current flows, and controls flow of the second current to update the voltage stored in the first capacitor while the first current is blocked.

20 Claims, 28 Drawing Sheets

(a)

(b)

OPTOELECTRONIC DEVICE

CROSS-REFERENCE TO RELATED APPLICATION

Japanese Application No. 2013-178372, filed on Aug. 29, 2013, and entitled, "Electro-Optical," is incorporated by reference herein in its entirety.

BACKGROUND

1. Field

One or more embodiments described herein relate to an optoelectronic device.

2. Description of the Related Art

An optoelectronic device has been developed to generate images using pixels equipped with organic electroluminescence light-emitting diodes (OLEDs). In such a device, the driving transistor in each pixel controls the amount of current supplied to the OLED. This amount of current is based on gray scale voltage. A full-color image is displayed by controlling the intensity of the current supplied to the OLEDs for respective colors.

The driving transistors have threshold voltages that are irregular. This irregularity causes the luminance of light emitted from the pixels to vary for the same gray scale voltages. As a result, the performance of the optoelectronic device is adversely affected.

SUMMARY

In accordance with one embodiment, an optoelectronic device includes a driving transistor electrically connected between a power supply and an electrode of a light-emitting element, the driving transistor to adjust a first current from the power supply based on a voltage stored in a first capacitor, the first capacitor connected between a gate and a source of the driving transistor, the driving transistor to supply the adjusted first current to the light-emitting element; a correction transistor electrically connected on a path of a second current flowing from the power supply to the first capacitor, the correction transistor to adjust an intensity of the second current based on a voltage stored in a second capacitor; and a control circuit to control the second capacitor to store a gray scale voltage while the first current flows, and to control flow of the second current to update the voltage stored in the first capacitor while the first current is blocked.

The second current may pass through the source of the driving transistor without passing through the driving transistor. The device may include a first switch to open and close a path of the first current, wherein the control circuit is to control the first switch.

The device may include a regulator to regulate the second current, wherein the control circuit controls the regulator to block the second current while the first current flows. The control circuit may adjust a potential of an electrode of the second capacitor connected to the correction transistor to turn off the correction transistor. The regulator may include a second switch to open and close a path of the second current. The correction transistor may be at a location spaced from a path of the first current, and may be electrically connected on the path of the first current.

The device may include a second switch connected in parallel with the driving transistor, the second switch to bypass and regulate the second current, wherein: the first and second currents flow through the correction transistor in a same direction, the control circuit is to control the second switch to block the second current while the first current flows based on control of the first switch, and is to control the second switch to control the second current to flow while the first current is blocked through a control of the first switch.

The device may include a second switch spaced from the path of the first current, the second switch to regulate the second current, wherein the first and second currents flow through the correction transistor in opposite directions, the control circuit is to control the second switch to block the second current while the first current flows through control of the first switch, and is to control the second switch for the second current to flow while the first current is blocked through control of the first switch.

In a period in which the first current flows through control of the first switch, the control circuit may adjust a potential of a first electrode opposite to a second electrode of the second capacitor connected to the correction transistor in a remaining period except for a period where a gray scale voltage is stored in the second capacitor, the adjusted potential to reduce source-drain impedance of the correction transistor, and restore a potential of the first electrode when the second current flows through a control of the second switch. The control circuit may initialize the first capacitor after the first current is blocked and before the second current flows.

In accordance with another embodiment, an optoelectronic device includes a driving transistor to adjust a first current from a power line based on a voltage stored in a first capacitor, the driving transistor to supply the adjusted first current to a light-emitting element; a correction transistor to adjust a second current based on a voltage stored in a second capacitor, the second current flowing from the power line to the first capacitor, and a control circuit to control the second capacitor to store a gray scale voltage while the first current flows, and to control flow of the second current to update the voltage stored in the first capacitor while the first current is blocked.

The second current may pass through the source of the driving transistor without passing through the driving transistor. The device may include a first switch to open and close a path of the first current.

The device may include a regulator to regulate the second current, wherein the control circuit controls the regulator to block the second current while the first current flows. The control circuit may adjust a potential of an electrode of the second capacitor connected to the correction transistor, to turn off the correction transistor. The regulator may include a second switch to open and close a path of the second current.

The correction transistor may be at a location spaced from a path of the first current, and may be electrically connected on the path of the first current.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
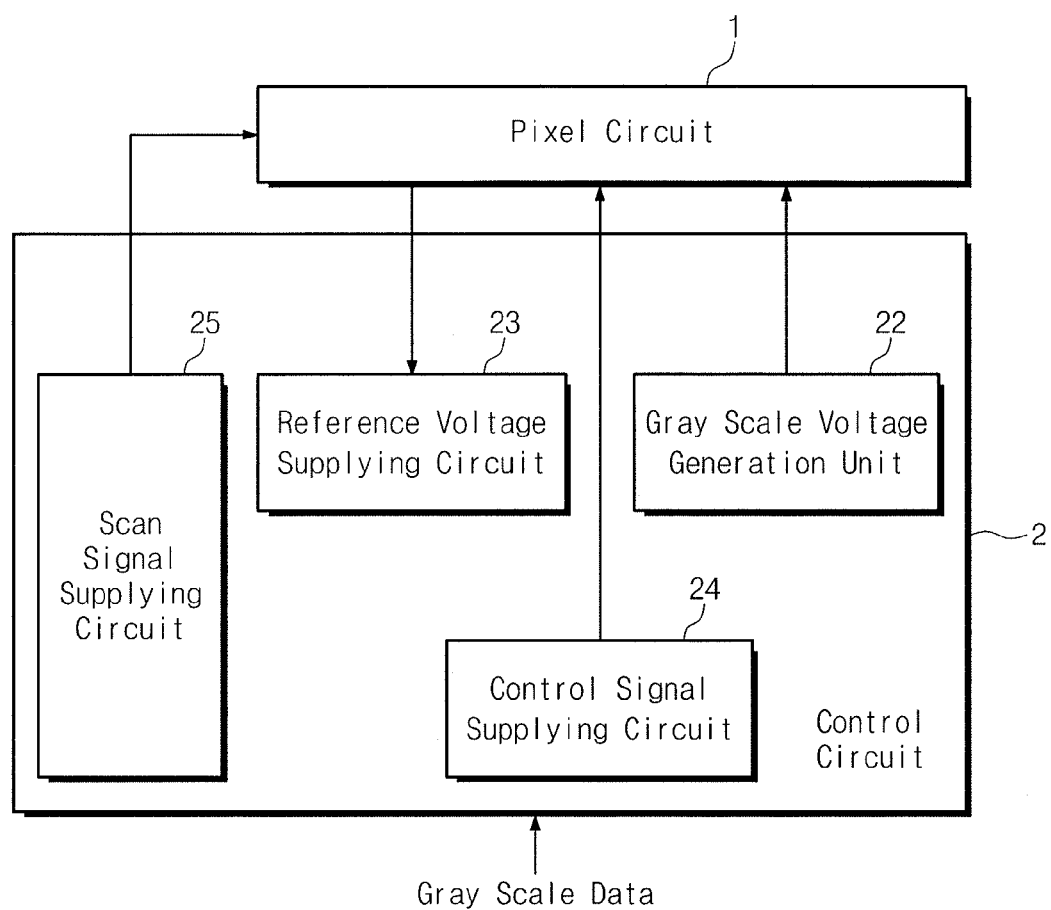
FIG. 1 illustrates an embodiment of an optoelectronic device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Figure 2:
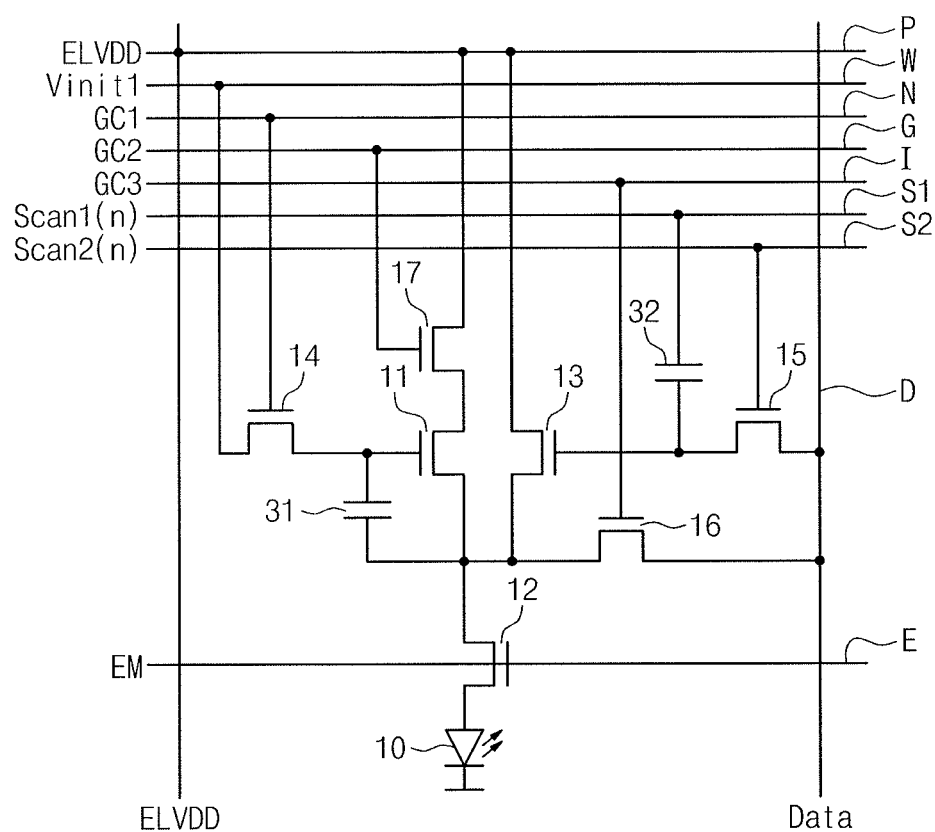
FIG. 2 illustrates an embodiment of a pixel circuit.

FIG. 1 illustrates an embodiment of an optoelectronic device, and FIG. 2 illustrates an embodiment of a pixel circuit 1, which, for example, may be included in a display panel of the optoelectronic device. The pixel circuit 1 may include a driving circuit for controlling an OLED.

An optoelectronic device includes a predetermined number (e.g., three) OLEDs per pixel. The OLEDs of each pixel emit different colors of light (e.g., red, green, and blue) to provide a full-color expression. The OLEDs are included in a display panel which includes a plurality of pixel circuits 1, each including a circuit for driving a respective one of the OLEDs 10. Also, the driving circuits are disposed in a matrix to form the display panel.

As illustrated in FIG. 2, a data line D is connected in common to the driving circuits of OLEDs 10 arranged in a column direction. A first scan line S1, a second scan line S2, a first initialization transistor driving line N, a blocking transistor driving line G, a second initialization transistor driving line I, and a light-emitting switch driving line E are connected in common to the driving circuit of each of the OLEDs 10 arranged in a row direction.

A first power line P and a second power line W are connected to the driving circuits of each of the OLEDs 10. The first power line P provides a constant voltage ELVDD sufficiently higher than a reference (e.g., ground) potential from a power supply circuit. The second power line W is supplied with a first initialization voltage Vint1 sufficiently lower than the voltage ELVDD.

As illustrated in FIG. 1, a first embodiment of the optoelectronic device includes a control circuit 2 for controlling the pixel circuits. The control circuit 2 receives an image signal which includes gray scale data of respective colors supplied from an external source, and supplies a gray scale voltage for setting the luminance of each OLED 10 or a second initialization voltage Vinit2 to the data line D. The control circuit also provides a first initialization transistor driving signal GC1, a power blocking signal GC2, a second initialization transistor driving signal GC3, a first scan signal Scan1, a second scan signal Scan2, and a light-emitting switch driving signal EM to the first initialization transistor driving line N, the power blocking transistor driving line G, the second initialization transistor driving line I, the first scan line S1, the second scan line S2, and the light-emitting switch driving line E, respectively.

In one embodiment, the control circuit 2 includes a gray scale data generation unit 22, a reference voltage supplying circuit 23, a control signal supplying circuit 24, and a scan signal supplying circuit 25. The reference voltage supplying circuit 23 supplies the first initialization voltage Vinit1 and the second initialization voltage Vinit2 to the second power line W and the data line D, respectively.

The gray scale voltage generation unit 22 generates a gray scale voltage to be set to each OLED 10 based on gray scale data of respective colors of each pixel (or sub-pixels). The gray scale voltage generation unit 22 supplies the gray scale voltage Data to a corresponding data line D sequentially from the OLED 10 of a first row every column of OLEDs 10.

The scan signal supplying circuit 25 provides the second scan line S2 with the second scan signal Scan2. The second scan signal Scan2 appoints a driving circuit of an OLED 10, to which the gray scale voltage Vdata sequentially supplied to each data line D from the gray scale voltage generation unit 22 is to be set. The scan signal supplying circuit 25 provides the first scan line S1 with the first scan signal Scan1 to shift a voltage to be applied to a gate of a transistor 13 to perform a correction operation.

The control signal supplying circuit 24 supplies the first initialization transistor driving line N, the power blocking transistor driving line G, the second initialization transistor driving line I, and the light-emitting switch driving line E with the first initialization transistor driving signal GC1, the power blocking signal GC2, the second initialization transistor driving signal GC3, and the light-emitting switch driving signal EM every vertical synchronization period.

As illustrated in FIG. 2, the driving circuit of each pixel circuit 1 includes a power blocking transistor 17 (corresponding to a switch for first current), a driving transistor 11, and a light-emitting switch transistor 12 are connected in series between the first power line P and an anode of the OLED 10. The power blocking transistor driving line G is electrically connected to a gate of the power blocking transistor 17. The light-emitting switch driving line E is electrically connected to a gate of the light-emitting switch transistor 12. A gate of the driving transistor 11 is electrically connected to the second power line W via the first initialization transistor 14. The first initialization transistor driving line N is electrically connected to a gate of the first initialization transistor 14.

A first capacitor 31 is connected between the gate of the driving transistor 11 and a connection node between a source of the driving transistor 11 and a drain of the light-emitting switch transistor 12. A second initialization transistor 16 is connected between the data line D and the connection node between the source of the driving transistor 11 and the drain of the light-emitting switch transistor 12. The compensation (or, correction) transistor 13 is connected between the first power line P and the connection node between the source of the driving transistor 11 and the drain of the light-emitting switch transistor 12. A gate of the second initialization transistor 16 is electrically connected to the second initialization transistor driving line I. A gate of the compensation transistor 13 is connected to the data line D via a scan transistor 15 and to the first scan line S1 via a second capacitor 32. A gate of the scan transistor 15 is connected to the second scan line S2.

Transistors 11 to 17 are N-channel MOSFETs. The driving transistor 11 and the compensation transistor 13 may have the same characteristics, e.g., their threshold voltages may be equal to each other.

Figure 3:
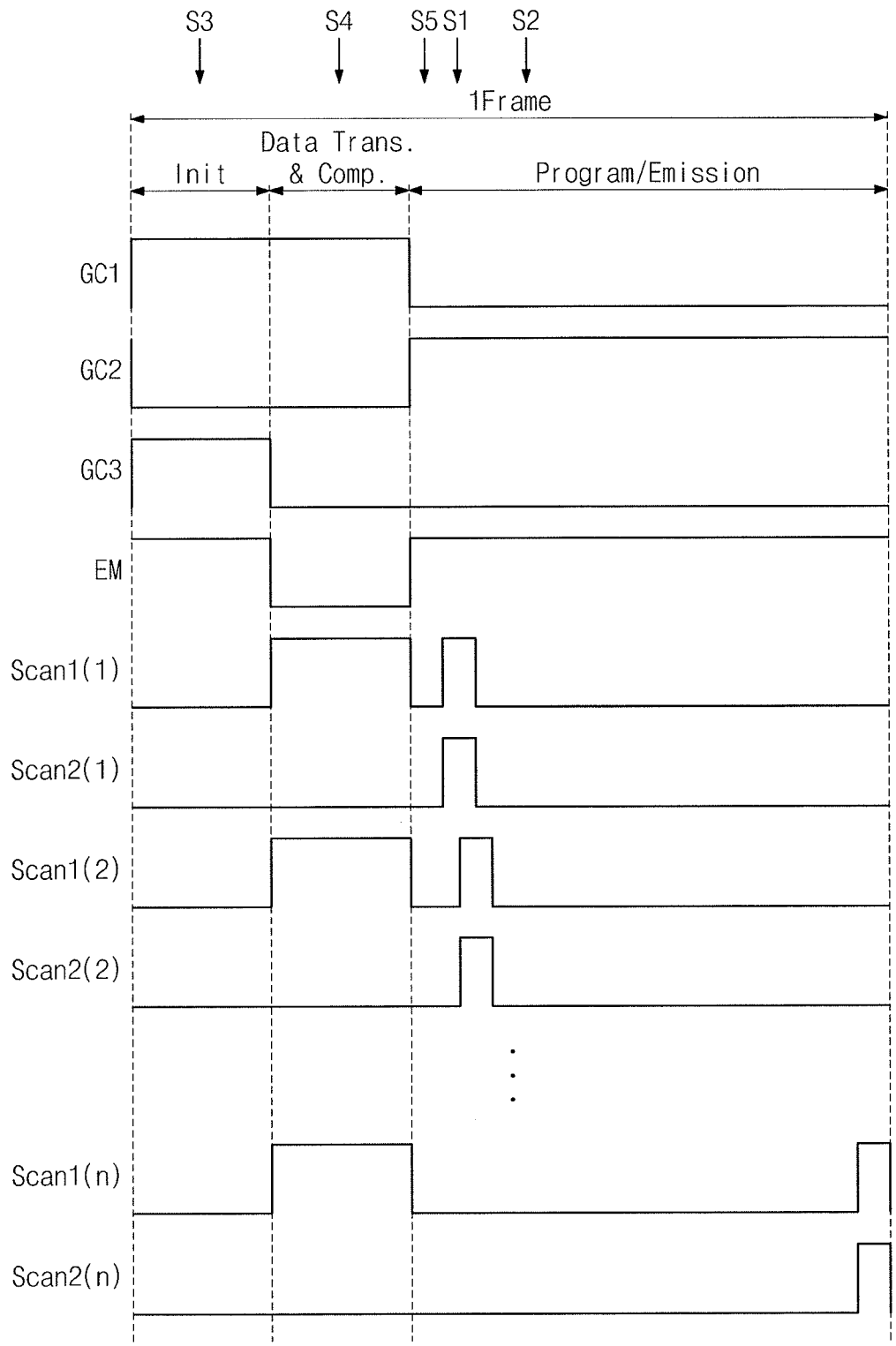
FIG. 3 illustrates an example of control signals for the pixel circuit.

FIG. 3 illustrates a timing diagram which includes signals for controlling the driving circuit of each pixel circuit 1, and FIGS. 4 to 8 illustrate different operating states corresponding to the timing diagram in FIG. 3. The operations in FIGS. 3 to 8 may be iterated whenever the gray scale voltage generation unit 22 generates a gray scale voltage of a frame unit by a period synchronized with a vertical synchronization signal.

The control circuit 2 may generate gray scale voltages on all columns of OLEDs 10 output in parallel, and may perform a program operation where gray scale signals sequentially output are provided to the driving circuits of the OLEDs 10 on a row-by-row basis.

Afterwards, the control circuit 2 simultaneously performs initialization on all OLED rows, Vth correction, and a transfer of data to the first capacitor 31. The control circuit 2 executes programming on gray scale data of a next frame, to control the OLEDs 10 to emit light based on the transmitted data. The following description is given from a point in time when programming on gray scale data of any frame is executed.

Figure 4:
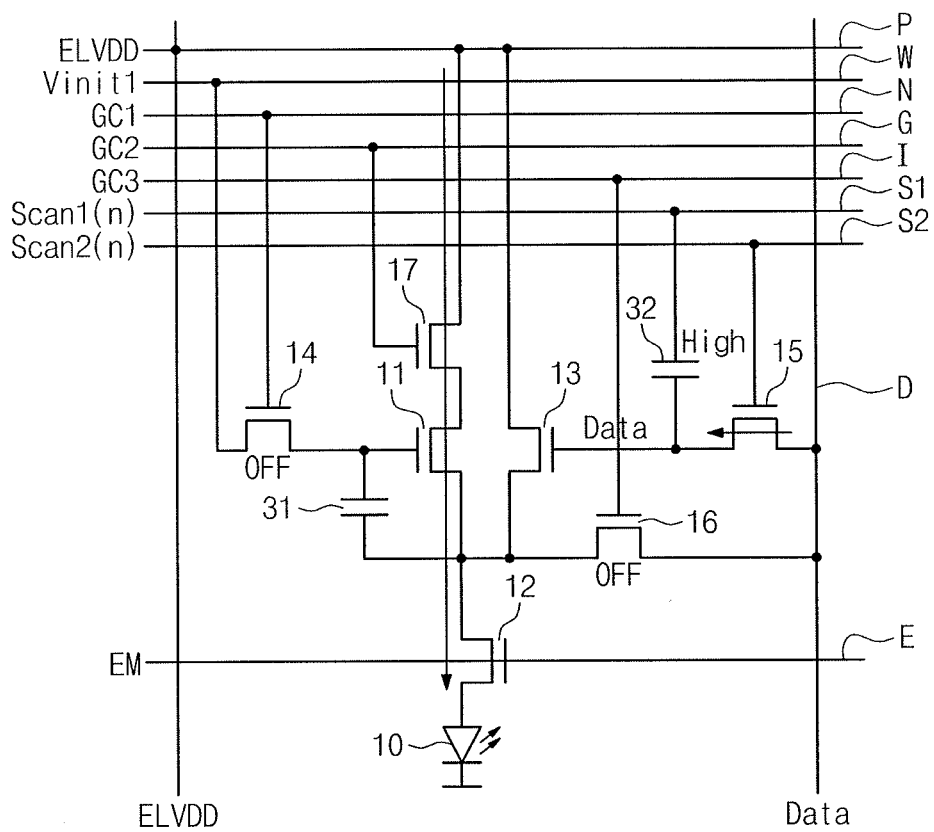
FIG. 4 illustrates an example of an operating state of the pixel circuit.

At time S1 in FIG. 3, the control circuit 2 sets a potential of a first initialization transistor driving signal GC1 to L (e.g., a first initialization transistor 14 is turned off), a power blocking signal GC2 to H (e.g., a power blocking transistor 17 is turned on), a potential of a second initialization transistor driving signal GC3 to L (e.g., a second initialization transistor 16 is turned off), and a potential of a light-emitting switch driving signal EM to H (e.g., a light-emitting switch transistor 12 is turned on) with respect to all rows (refer to FIG. 4).

With this condition, in the driving circuits of all OLEDs 10, the first capacitor 31 is floated, and the driving transistor 11 supplies current (e.g., corresponding to first current) to the OLED 10 according to a voltage Vgs (=Vinit1−Data+Vth) that the first capacitor 31 holds based on a gray scale voltage of a previous frame. As a result, the OLED 10 emits light at a luminance corresponding to the gray scale voltage.

At the same time, the control circuit 2 switches potentials of first and second scan signals Scan1 and Scan2 to L (e.g., a scan transistor 15 is turned off) with respect to remaining rows, except for a scan-target row (e.g., a first row at the beginning and switched into a next row sequentially according to a horizontal synchronization signal). The control circuit 2 also switches potentials of the first and second scan signals Scan1 and Scan2 to H (e.g., the scan transistor 15 is turned on) with respect to the scan-target row (refer to FIG. 4).

At this time, the control circuit 2 supplies a gray scale voltage Data for OLEDs 10 of the scan-target row to the data line D, and the gray scale voltage Data is stored (or, accumulated) in a second capacitor 32. The gray scale voltage Data is applied to a gate of a correction transistor 13. However, because a difference between the gate voltage Data and the source voltage of the correction transistor 13 is set to be greater than Vth, even though the gray scale voltage Data is a minimum value, the correction transistor 13 is turned on and a second initialization transistor 16 is turned off. Thus, overlapping current (e.g., corresponding to second current) flows from ELVDD with respect to the OLED 10.

However, because the horizontal synchronization period where the correction transistor 13 is turned on is sufficiently shorter than the vertical synchronization period where the OLED 10 continues to emit light, such current (e.g., the overlapping current) may not influence brightness of the OLED 10 in external appearance. The reason is that a viewer perceives the brightness of the OLED 10 as an integral value of luminance during the horizontal scan period.

The control circuit 2 may perform the above-described programming for all rows as a scan-target row is sequentially changed whenever a horizontal synchronization signal is received.

Figure 5:
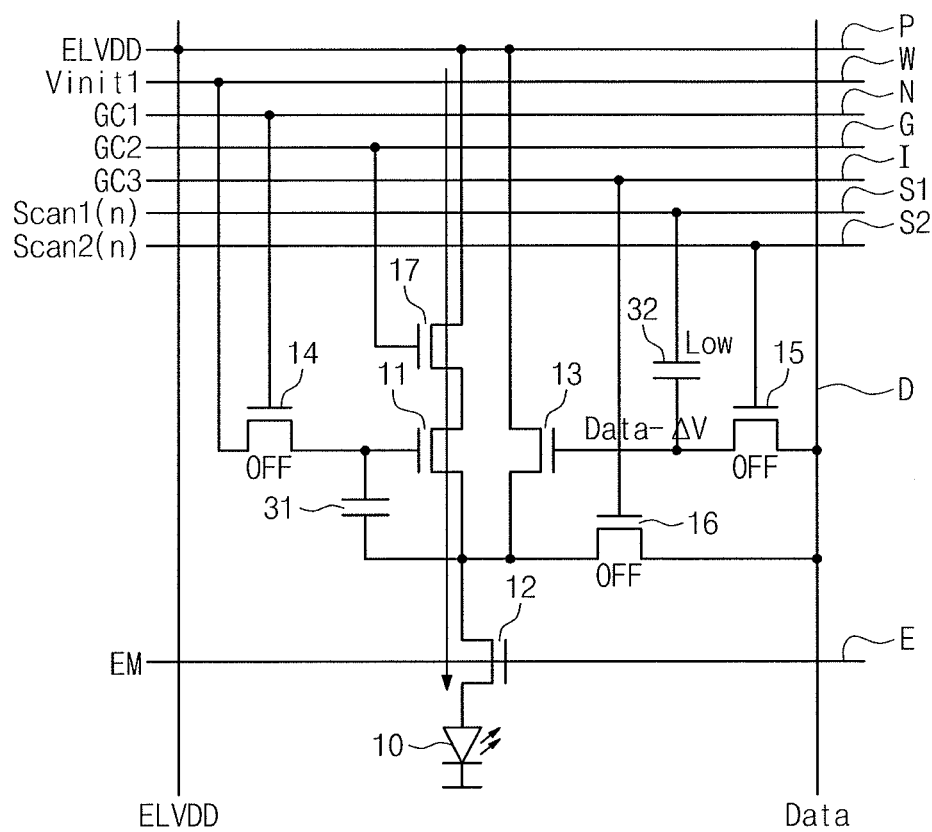
FIG. 5 illustrates an example of another operating state of the pixel circuit.
Figure 6:
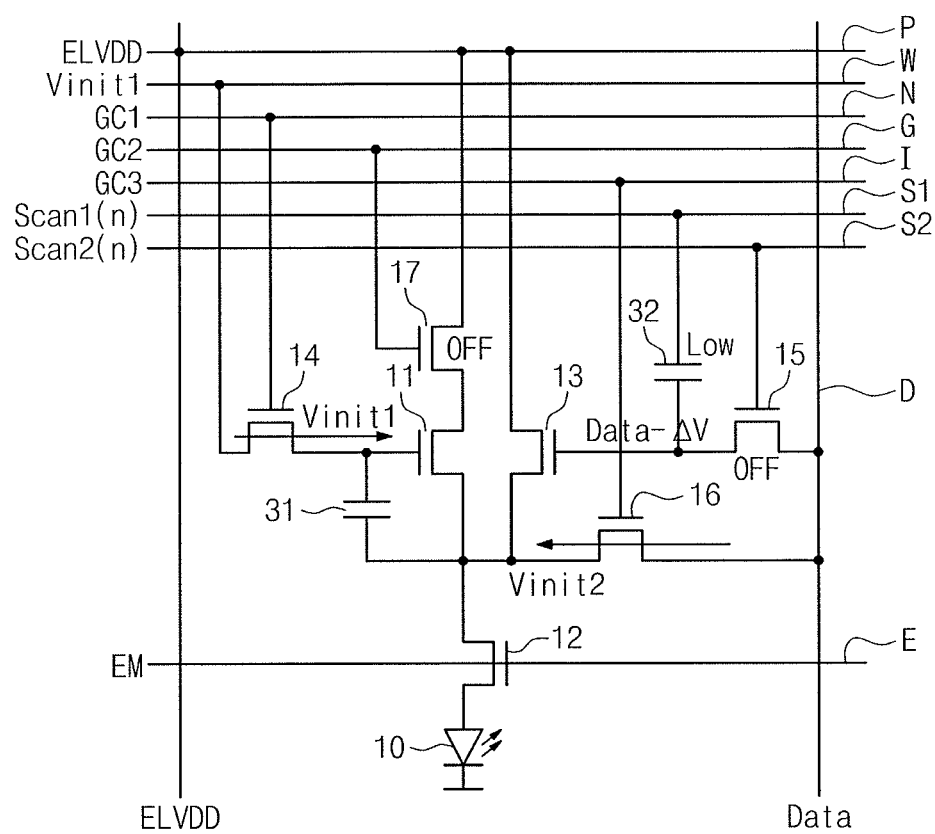
FIG. 6 illustrates an example of another operating state of the pixel circuit.

FIG. 5 shows an operating state of the driving circuit at time S2, when a scan-target row is switched to a next row after programming on any row is performed. For example, when a scan-target row is switched to a next row, the control circuit 2 sets potentials of the first and second scan signals Scan1 and Scan2, of a row in which programming is completed, to L (e.g., the scan transistor 15 is turned off). The amplitude ΔV (=H−L) of the first scan signal Scan1 on the first scan line S1 may be decreased due to capacitive coupling of the second capacitor 32. As a result, the voltage applied to a gate of the correction transistor 13 may be expressed as (Data−ΔV).

Because a value of the amplitude ΔV is set such that a difference between a gate voltage (Data−ΔV) and a source voltage of the correction transistor 13 is less than Vth, even though a gray scale voltage Data is a maximum value, the correction transistor 13 is turned off. In this case, current (e.g., corresponding to the second current) flowing from the correction transistor 13 to the OLED 10 is blocked. Thus, the control circuit 2 performing the above-described operation may regulate the second current.

When programming on all rows is completed, At time S3 in FIG. 3, the control circuit 2 switches a voltage supplied to the data line D to the second initialization voltage Vinit2. Simultaneously, the control circuit 2 sets potentials of the first and second scan signals Scan1 and Scan2 on all rows to L (e.g., the scan transistor 15 is turned off), a potential of the first initialization transistor driving signal GC1 to H (e.g., the first initialization transistor 14 is turned on), a potential of the power blocking signal GC2 to L (e.g., the power blocking transistor 17 is turned off), and a potential of the second initialization transistor driving signal GC3 to H (e.g., the second initialization transistor 16 is turned on) (refer to FIG. 6).

In this case, the OLED 10 is turned off because current (corresponding to the first current) from ELVDD is blocked by the power blocking transistor 17. Also, a gate potential of the driving transistor 11 is reset to the first initialization voltage Vinit1, and its source potential is reset to the second initialization voltage Vinit2.

At this time, because the second initialization voltage Vinit2 is greater than (Data−ΔV) even though Data is a maximum value and is also set to be lower than a threshold voltage of the OLED 10, the correction transistor 13 remains in an OFF state. Thus, a short circuit between the first power line P and the data line D is prevented.

Also, at this time, because the light-emitting switch transistor 12 is turned on, charge accumulated in the parasitic capacitance of the OLED 10 during light emission of a previous frame is discharged. Thus, in case a value of a gray scale voltage Data corresponds to a black value, current flow into the OLED 10 and light emission are prevented.

Figure 7:
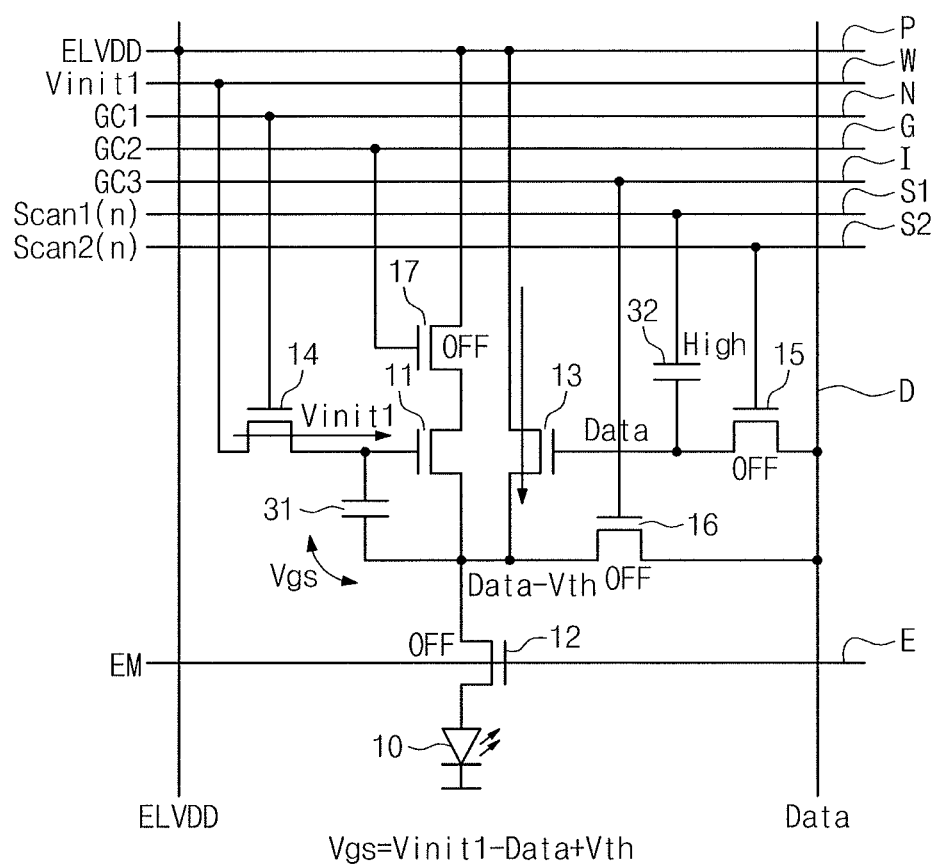
FIG. 7 illustrates an example of another operating state of the pixel circuit.

At time S4 in FIG. 3, the control circuit 2 sets a potential of the second initialization transistor driving signal GC3 to L (e.g., the second initialization transistor 16 is turned off), a potential of the light-emitting switch driving signal EM to L (e.g., the light-emitting switch transistor 12 is turned off), and a potential of the first scan signal Scan1 to H with respect to all rows (refer to FIG. 7). By increasing the amplitude ΔV (=H−L) of the first scan signal Scan1, a gate potential of the correction transistor 13 is set to an original gray scale voltage Data.

As described above, the correction transistor 13 is turned on because a difference between the gate voltage Data and the source voltage of the correction transistor 13 is set to become greater than Vth, even though the gray scale voltage Data is a minimum value. In this case, the correction transistor 13 operates as a source follower circuit, where current (corresponding to the second current) from ELVDD flows through the correction transistor 13, a source of the driving transistor 11, the first capacitor 31, and the first initialization transistor 14. Also, the source voltage of the correction transistor 13 becomes (Data−Vth). At this time, the gate-source voltage Vgs (=Vinit1−Data+Vth) of the driving transistor 11 is held in the first capacitor 31.

Figure 8:
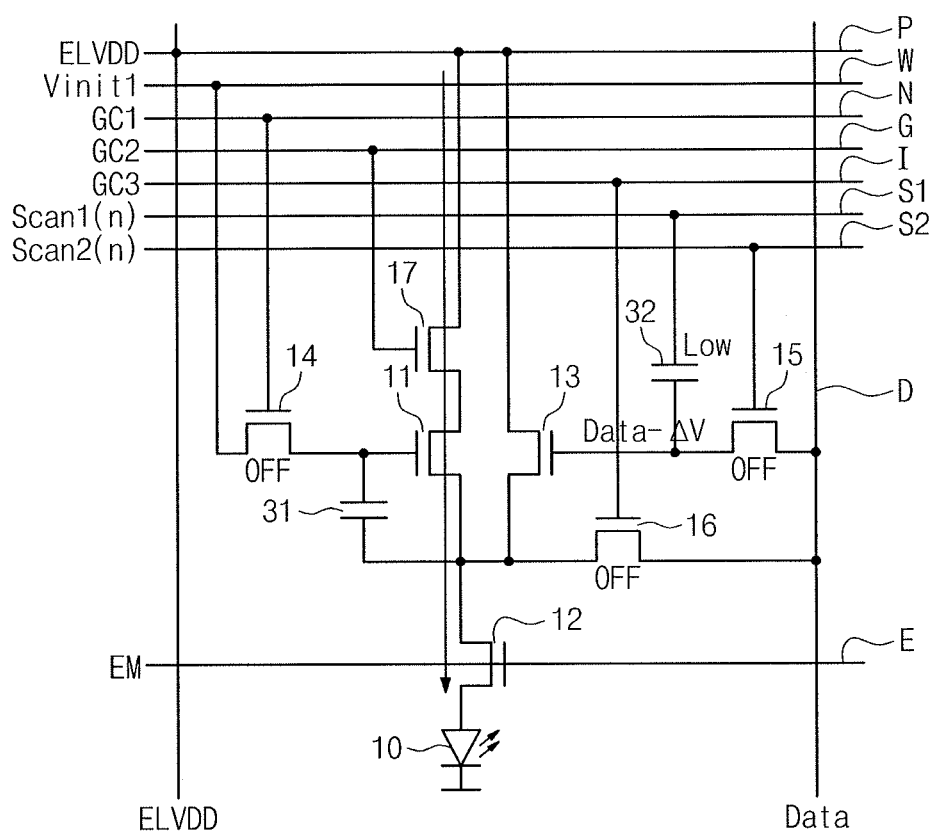
FIG. 8 illustrates an example of another operating state of the pixel circuit.

At time S5 in FIG. 3, the control circuit 2 sets a potential of the first initialization transistor driving signal GC1 to L (e.g., the first initialization transistor 14 is turned off), a potential of the power blocking signal GC2 to H (e.g., the power blocking transistor 17 is turned on), a potential of the light-emitting switch driving signal EM to H (e.g., the light-emitting switch transistor 12 is turned on), and a potential of the first scan signal Scan1 to L with respect to all rows (refer to FIG. 8).

With this condition, in the driving circuits of all OLEDs 10, the correction transistor 13 is turned off and the first capacitor 31 is floated. Also, current (corresponding to the first current), which is proportional to a voltage (Vinit1−Data) dropped by a threshold voltage Vth from a voltage Vgs (=Vinit1−Data+Vth) held in the first capacitor 31, flows between a source and a drain of the driving transistor 11, the thereby control the OLED 10 to emit light. The luminance of the OLED 10 therefore depends on the gray scale voltage Data.

Afterwards, under control of the control circuit 2, the OLED 10 continues to emit light until the period corresponding to S2 ends and a process following S1 is performed to receive a next gray scale voltage.

As described above, a memory (e.g., the second capacitor 32) for data input is provided independently from a memory (e.g., the first capacitor 31) for holding Vgs of the driving transistor 11. Also, Vth correction is performed by the correction transistor 13 when charge (gray scale voltage Data) is transferred from the memory of the former to the memory of the latter. Because light emission from the OLED 10 through the memory (the first capacitor 31) of the latter and programming on the memory (the second capacitor 32) of the former are executed in parallel, it is possible to provided a sufficient time for the programming and Vth correction.

Figure 9:
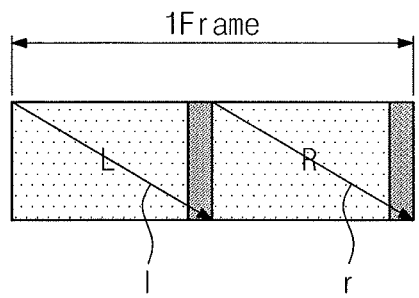
FIG. 9 illustrates an example of driving a three-dimensional display in a frame-sequential manner.

Therefore, as illustrated in FIG. 9, even though a three-dimensional image is displayed in a frame-sequential manner, an image is displayed by controlling each OLED 10 to emit light during a remaining time, except for a transition period where left and right shutters are simultaneously opened and closed. Simultaneously, programming is performed in a period where an image of each frame is displayed and in a period where left and right shutters are simultaneously closed.

In FIG. 9, the abscissa corresponds to an elapsed time and the ordinate corresponds to a row of a display. A portion marked by a dark color indicates a transition period where left and right shutters are simultaneously opened and closed. The arrow I indicates a timing when Vth correction and data input begin with respect to the OLEDs of each row, for the purpose of displaying a left-eye image.

A period L marked by dots indicates a light-emitting period of each row where a left-eye image is displayed. The arrow r indicates timing when Vth correction and data input begin with respect to the OLEDs of each row, for the purpose of displaying a right-eye image. The period R marked by dots indicates a light-emitting period of each row where a right-eye image is displayed.

Thus, in this embodiment, Vth correction is finely executed by making increasing the program period, regardless of whether an image becomes brighter in external appearance, by elongating a light-emitting time. Also, because data stored in memory (the second capacitor 32) is transferred to the memory (the first capacitor 31) using the correction transistor 13 as a source follower circuit, a gray scale voltage Data is transferred without voltage drop, even though the voltages stored in the memories may vary.

Figure 10:
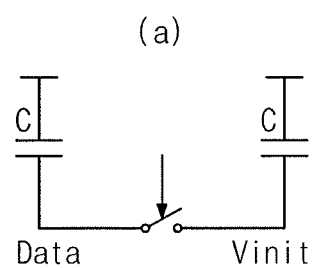
FIG. 10 illustrates an example of the performance of the optoelectronic device.
Figure 10:
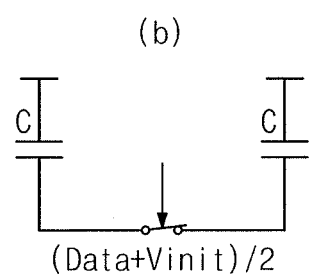

FIG. 10 shows examples where charge is transferred with capacitors simply connected to each other. Because the data voltage decreases due to charge sharing in this case, the usefulness of present embodiment becomes apparent. Also, because a voltage swing of ELVDD may be unnecessary, it is possible to narrow an edge of a display panel and to achieve a reduced voltage drop. As a result, an OLED driving circuit according to present embodiment may be used for a large-scaled display panel.

Figure 11:
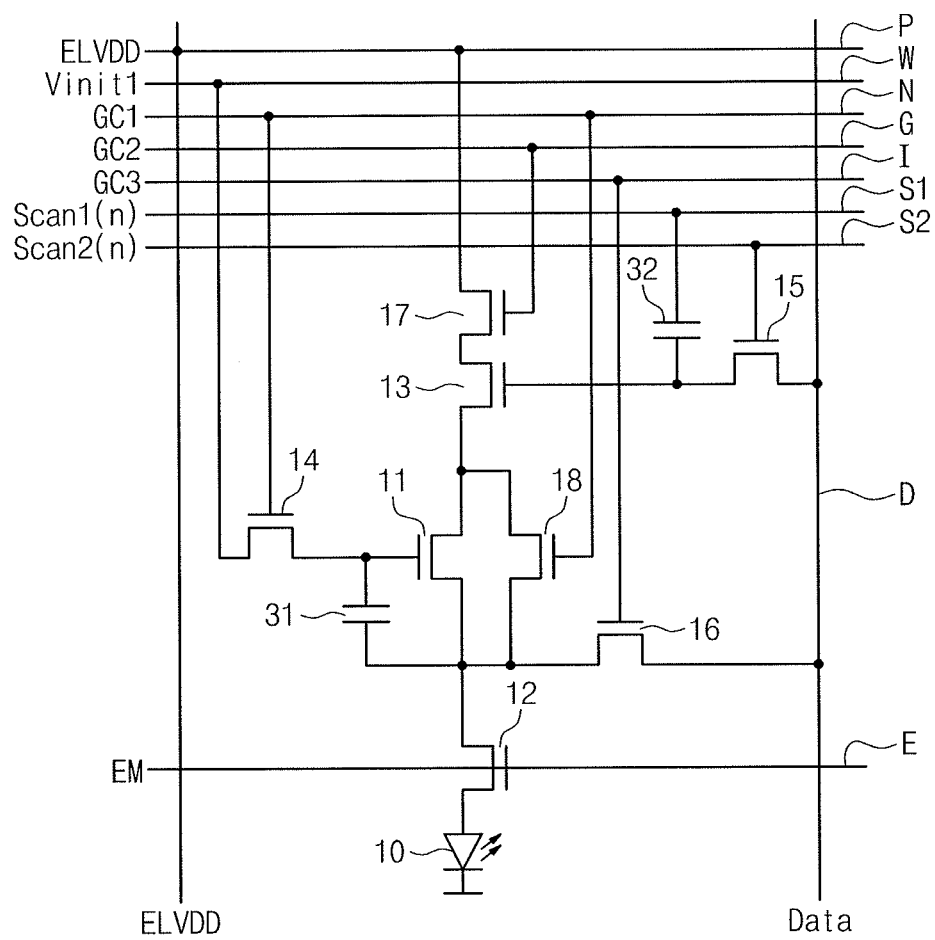
FIG. 11 illustrates another embodiment of a pixel circuit.

FIG. 11 illustrates another embodiment of the pixel circuit 1, which includes a driving circuit for controlling an OLED 10. Such a pixel circuit may be included in another embodiment of an optoelectronic device having a structure similar to FIG. 1.

As illustrated in FIG. 11, a correction transistor 13 is connected in series to a driving transistor 11, e.g., on a path of first current. That is, a power blocking transistor 17 (e.g., corresponding to a switch for first current), the correction transistor 13, the driving transistor 11, and a light-emitting switch transistor 12 are connected in series between the first power line P and the anode of an OLED 10.

Also, the power blocking transistor driving line G is electrically connected to a gate of the power blocking transistor 17. The light-emitting switch driving line E is electrically connected to a gate of the light-emitting switch transistor 12. The gate of the driving transistor 11 is electrically connected to the second power line W via a first initialization transistor 14. The first initialization transistor driving line N is electrically connected to a gate of the first initialization transistor 14.

Also, a bypass transistor 18 (e.g., corresponding to a switch for second current as a means for regulating the second current) is connected between a drain and a source of the driving transistor 11. The gate of the bypass transistor 18 is electrically connected to the first initialization transistor driving line N.

A first capacitor 31 is connected between the gate of the driving transistor 11 and a connection node between a source of the driving transistor 11 and a drain of the light-emitting switch transistor 12. A second initialization transistor 16 is connected between the data line D and the connection node between the source of the driving transistor 11 and the drain of the light-emitting switch transistor 12. The gate of the second initialization transistor 16 is electrically connected to a second initialization transistor driving line I. The gate of the compensation transistor 13 is connected to the data line D via a scan transistor 15 and to a first scan line S1 via a second capacitor 32. The gate of the scan transistor 15 is connected to a second scan line S2.

The transistors 11 to 17 are N-channel MOSFETs. The driving transistor 11 and the compensation transistor 13 may have the same characteristics, e.g., their threshold voltages may be equal to each other.

Figure 12:
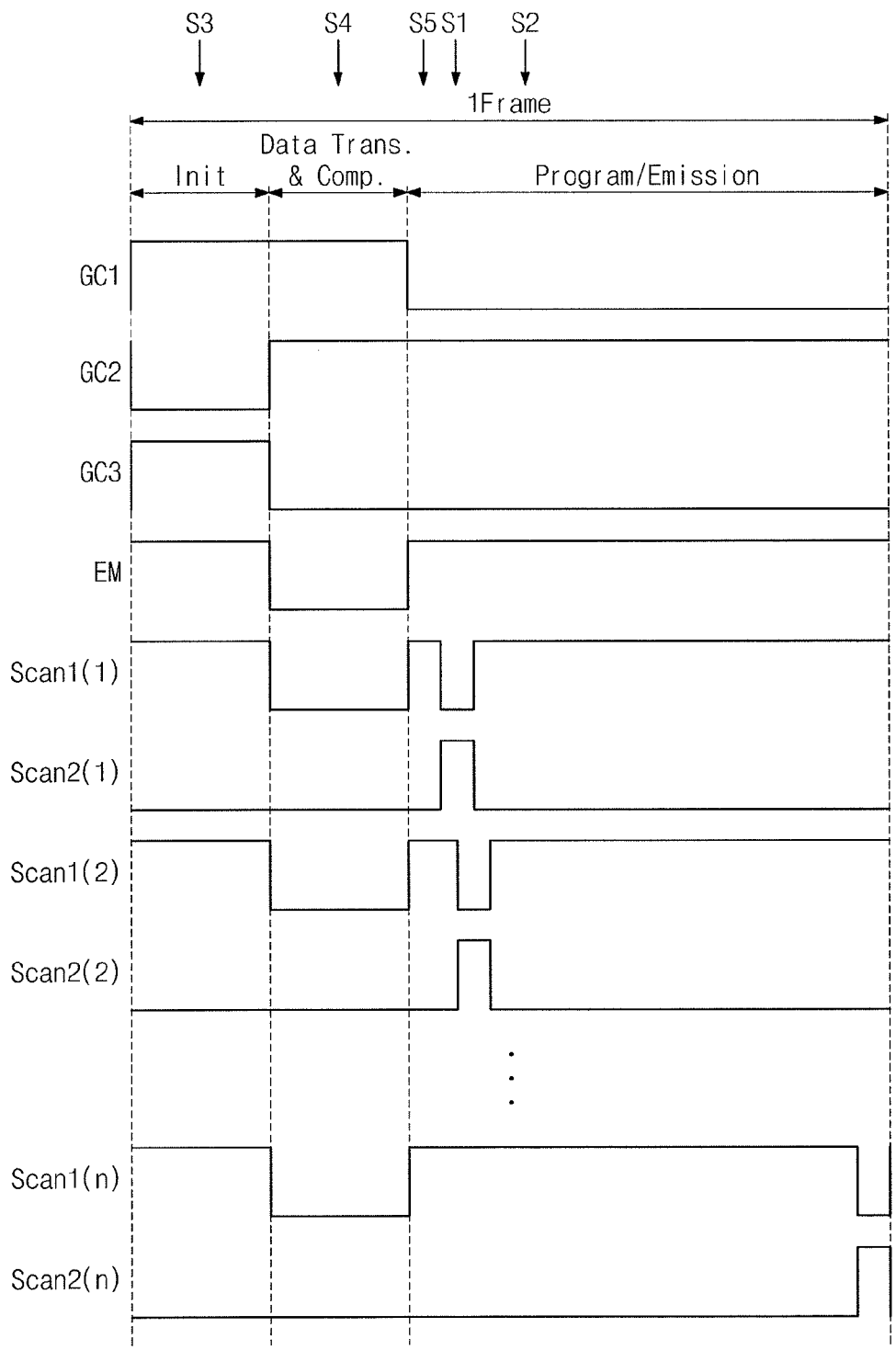
FIG. 12 illustrates an example of control signals for the pixel circuit.

FIG. 12 is an example of a timing diagram for controlling the pixel circuit in FIG. 11, and FIGS. 13 to 17 illustrate different operation states corresponding to the timing diagram in FIG. 12. The control method of FIGS. 12 to 17 may be iterated whenever a gray scale voltage generation unit 22 generates a gray scale voltage of a frame unit by a period synchronized with a vertical synchronization signal.

The control circuit 2 may output gray scale voltages on all columns of the OLEDs 10 in parallel, and may perform a program operation where gray scale signals sequentially output by the pixel are provided to the driving circuits of OLEDs 10 on a row-by-row basis. Afterwards, the control circuit 2 may simultaneously perform initialization on all OLED rows, Vth correction, and a transfer of data to the first capacitor 31. Also, the control circuit 2 may execute programming on gray scale data of a next frame, in order to control the OLEDs 10 to emit light according to transmitted data. The following operations are described from a point in time when programming on gray scale data of any frame is executed.

Figure 13:
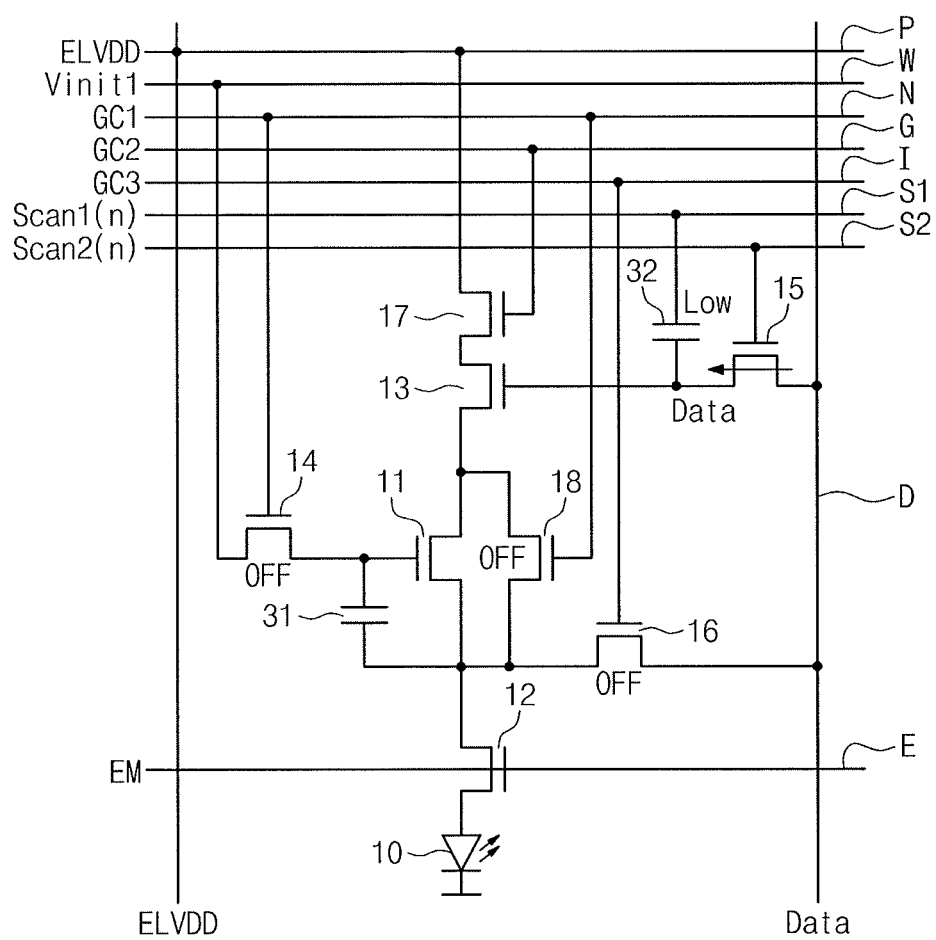
FIG. 13 illustrates an example of an operating state of the pixel circuit.

At time S1 in FIG. 12, the control circuit 2 sets a potential of a first initialization transistor driving signal GC1 to L (e.g., a first initialization transistor 14 is turned off and a bypass transistor 18 is turned off), a potential of a power blocking signal GC2 to H (e.g., a power blocking transistor 17 is turned on), a second initialization transistor driving signal GC3 to L (e.g., a second initialization transistor 16 is turned off), and a potential of a light-emitting switch driving signal EM to H (e.g., a light-emitting switch transistor 12 is turned on) with respect to all rows (refer to FIG. 13).

With this condition, in the driving circuits of all OLEDs 10, the first capacitor 31 is floated and the driving transistor 11 supplies current (e.g., corresponding to first current) to the OLED 10 according to a voltage Vgs (=Vinit1−Data+Vth) that the first capacitor 31 holds, based on the gray scale voltage of a previous frame. As a result, the OLED 10 is controlled to emit light with a luminance corresponding to the gray scale voltage.

At the same time, the control circuit 2 switches a potential of a first scan signal Scan1 to H and a potential of a second scan signal Scan2 to L (e.g., a scan transistor 15 is turned off) with respect to remaining rows, except for a scan-target row (e.g., a first row at the beginning and switched into a next row sequentially according to a horizontal synchronization signal). Also, the control circuit 2 switches a potential of the first scan signal Scan1 to L and a potential of the second scan signal Scan2 to H (e.g., the scan transistor 15 is turned on) with respect to the scan-target row (refer to FIG. 13).

At this time, the control circuit 2 supplies gray scale voltage Data for the OLEDs 10 of the scan-target row to the data line D. The gray scale voltage Data is stored (or, accumulated) in the second capacitor 32, and is applied to the gate of the correction transistor 13. However, because a difference between a gate voltage Data and a source voltage of the correction transistor 13 is set to be greater than Vth, the correction transistor 13 is turned on, even though the gray scale voltage Data is a minimum value.

Also, at this time, the intensity of current (corresponding to first current) supplied to the OLED 10 through the correction transistor 13 depends on the gray scale voltage Data held in the second capacitor 32. However, because the horizontal synchronization period is sufficiently shorter than a vertical synchronization period in which the OLED 10 continues to emit light, this current does not influence the brightness of the OLED 10 in external appearance. The is because a viewer perceives the brightness of the OLED 10 as an integral value of luminance during the horizontal scan period.

The control circuit 2 performs the above-described programming for all rows as a scan-target row is sequentially changed whenever a horizontal synchronization signal is received.

Figure 14:
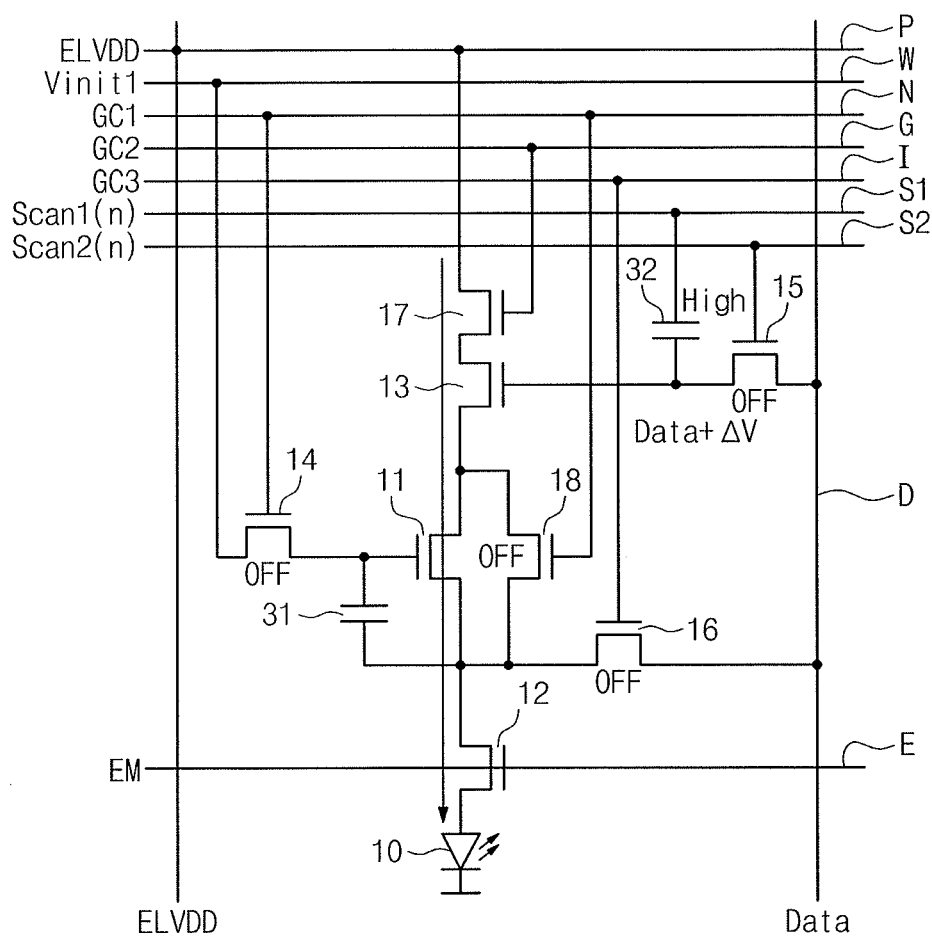
FIG. 14 illustrates an example of another operating state of the pixel circuit.
Figure 15:
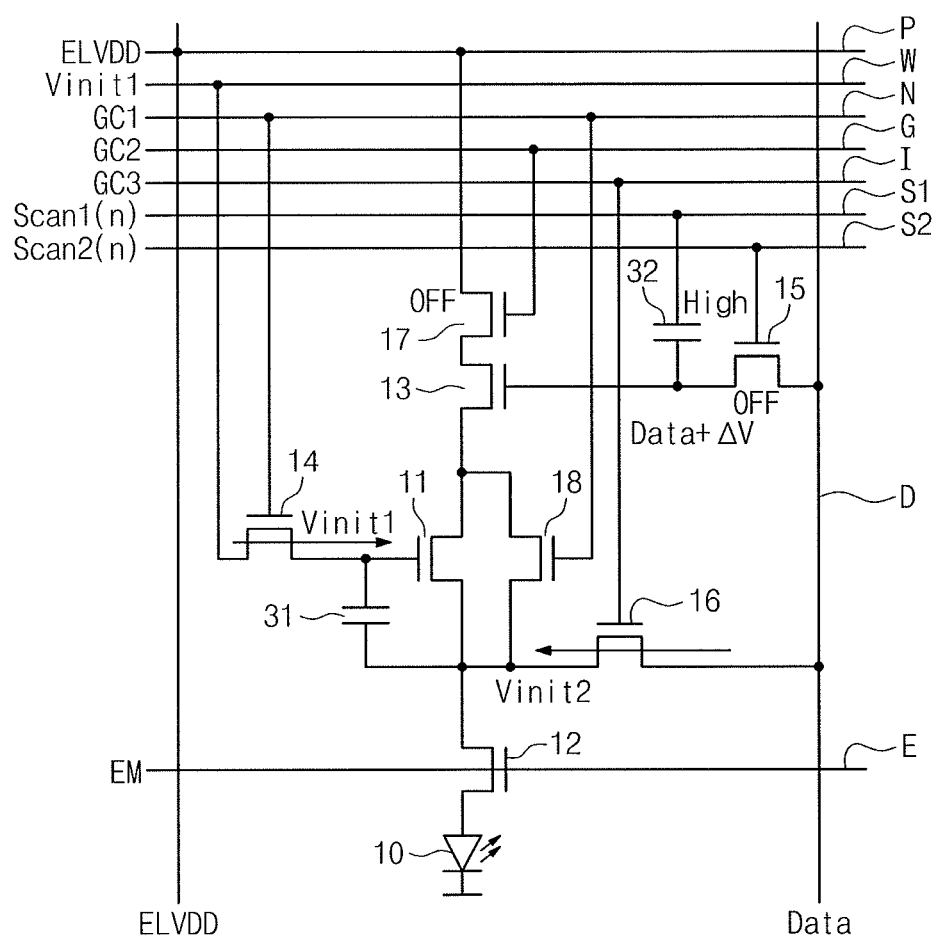
FIG. 15 illustrates an example of another operating state of the pixel circuit.

FIG. 14 shows an operation state of the driving circuit at time S2, when a scan-target row is switched to a next row after programming on a row is performed. For example, when a scan-target row is switched to a next row, the control circuit 2 sets the first and second scan signals Scan1 and Scant, of a row at which programming is completed, to H and L, respectively (e.g., the scan transistor 15 is turned off).

By shifting the amplitude ΔV (=H−L) of the first scan signal Scan1 on the first scan line S1 due to the capacitive coupling of the second capacitor 32, a voltage applied to a gate of the correction transistor 13 is (Data+ΔV). Because a value of the amplitude ΔV is set to be sufficiently greater than a maximum value of Data, and the source-drain impedance of the correction transistor 13 approximates to a minimum value, current supplied to the OLED 10 is completely controlled by the driving transistor 11. As a result, the OLED 10 resumes emitting light at a luminance that corresponds to a voltage Vgs (=Vinit1−Data+Vth) held in the first capacitor 31. The control circuit 2 performing the above-described operation may therefore regulate the second current.

When programming on all rows is completed, at time S3 in FIG. 12, the control circuit 2 switches a voltage supplied to the data line D into a second initialization voltage Vinit2. Simultaneously, the control circuit 2 sets the potential of the first initialization transistor driving signal GC1 to H (e.g., the first initialization transistor 14 is turned on and the bypass transistor 18 is turned on), a potential of the power blocking signal GC2 to L (e.g., the power blocking transistor 17 is turned off), and a potential of the second initialization transistor driving signal GC3 to H (e.g., the second initialization transistor 16 is turned on) (refer to FIG. 15).

In this case, the OLED 10 is turned off because current (corresponding to the first current) from ELVDD is blocked by the power blocking transistor 17. Also, the gate potential of the driving transistor 11 is reset to the first initialization voltage Vinit1, and its source potential is reset to the second initialization voltage Vinit2. At this time, because the light-emitting switch transistor 12 is turned on, charge accumulated in parasitic capacitance of the OLED 10 at light-emitting of a previous frame is discharged. Thus, a value of a gray scale voltage Data corresponds to a black value, and current flow into the OLED 10 and light-emitting are prevented. Also, because the power blocking transistor 17 is turned off, a short circuit between the first power line P and the data line D is prevented.

Figure 16:
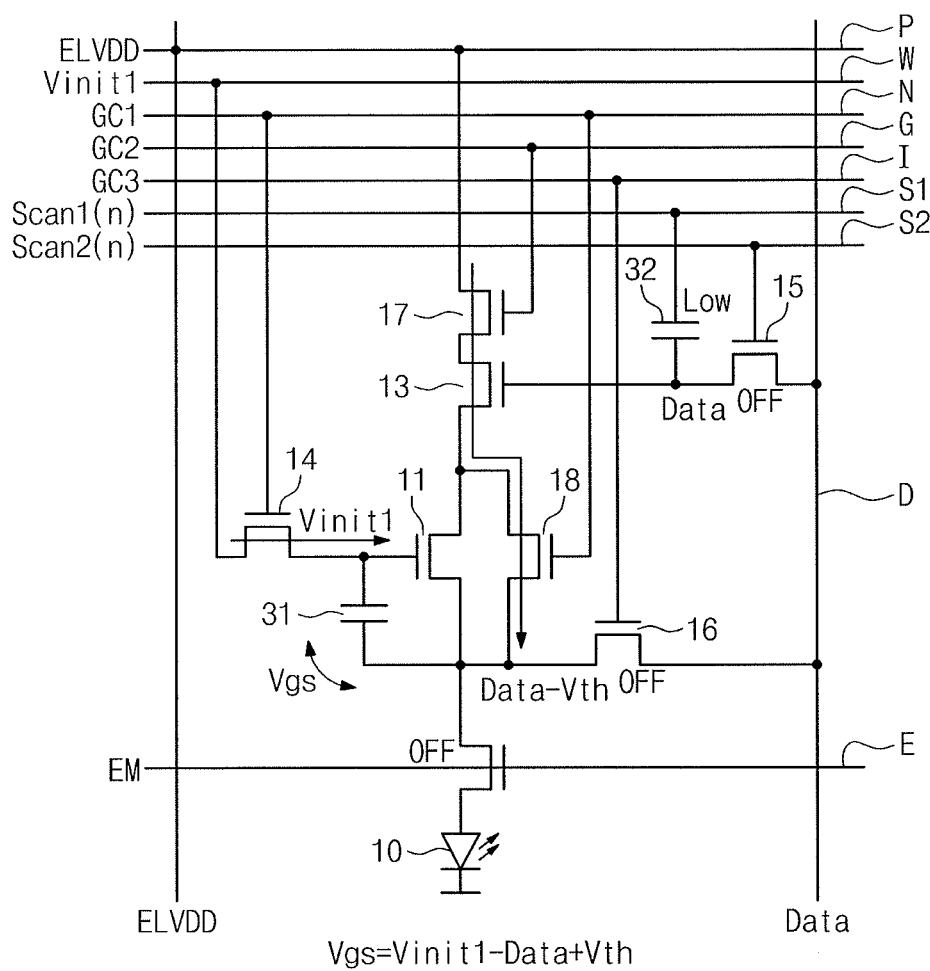
FIG. 16 illustrates an example of another operating state of the pixel circuit.

At time S4 in FIG. 12, the control circuit 2 sets the potential of the power blocking signal GC2 to H (e.g., the power blocking transistor 17 is turned on), the potential of the second initialization transistor driving signal GC3 to L (e.g., the second initialization transistor 16 is turned off), the potential of the light-emitting switch driving signal EM to L (e.g., the light-emitting switch transistor 12 is turned off), and the potential of the first scan signal Scan1 to L with respect to all rows (refer to FIG. 16).

At this time, because the first initialization transistor 14 is turned on, a voltage applied to a gate of the driving transistor is the first initialization voltage Vinit1 and the driving transistor 11 is turned off. Because the potential of the first initialization transistor driving signal GC1 is H and the bypass transistor 18 is turned on, current (corresponding to the second current) from ELVDD flows through the bypass transistor 18 when the power blocking transistor 17 is turned on.

By decreasing the amplitude ΔV (=H−L) of the first scan signal Scan1, the gate potential of the correction transistor 13 corresponds to an original gray scale voltage Data. Therefore, the correction transistor 13 operates as a source follower circuit, and current from ELVDD flows through the power blocking transistor 17, the correction transistor 13, the bypass transistor 18, a source of the driving transistor 11, the first capacitor 31, and the first initialization transistor 14. Also, the source voltage of the correction transistor 13 becomes (Data−Vth). Because the drain-source impedance of the bypass transistor 18 in a turned on state is almost 0, the source voltage of the driving transistor 11 is the same as (Data−Vth). At this time, a gate-source voltage Vgs (=Vinit1−Data+Vth) of the driving transistor 11 is held in the first capacitor 31.

Figure 17:
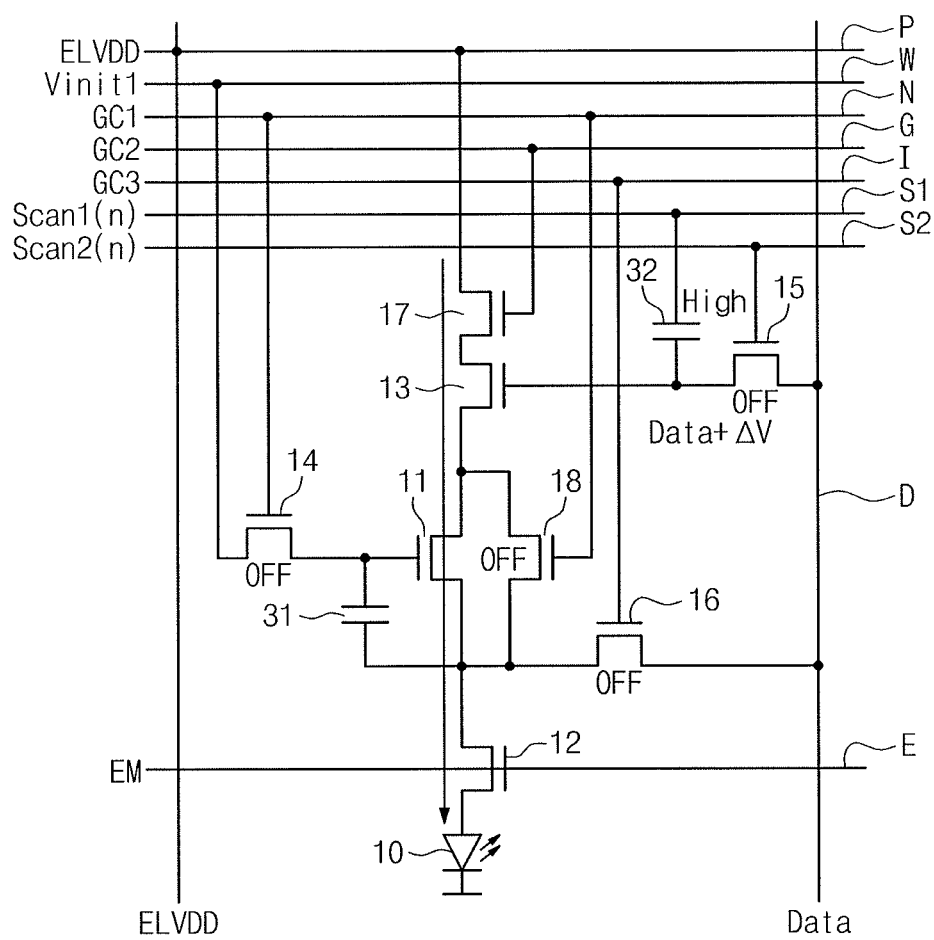
FIG. 17 illustrates an example of another operating state of the pixel circuit.

At time S5 in FIG. 12, the control circuit 2 sets the potential of the first initialization transistor driving signal GC1 to L (e.g., the first initialization transistor 14 is turned off and the bypass transistor 18 is turned off), the potential of the light-emitting switch driving signal EM to H (e.g., the light-emitting switch transistor 12 is turned on), and the potential of the first scan signal Scan1 to H with respect to all rows (refer to FIG. 17).

With this condition, in the driving circuits of all the OLEDs 10, the first capacitor 31 is floated. Also, current (corresponding to the first current) proportional to a voltage (Vinit1−Data), dropped by a threshold voltage Vth from a voltage Vgs (=Vinit1−Data+Vth) held in the first capacitor 31, flows between a source and a drain of the driving transistor 11 so that the OLED 10 emits light. This luminance of the OLED 10 therefore depends on the gray scale voltage Data.

Afterwards, control circuit 2 controls the OLED 10 to continue to emit light until period S2 ends. The control circuit 2 also executes a process following the operation of time S1 to receive a next gray scale voltage.

As described above, the memory (the second capacitor 32) for data input is provided independently of the memory (the first capacitor 31) for holding Vgs of the driving transistor 11. Also, Vth correction is performed by the correction transistor 13 when charge (gray scale voltage Data) is transferred from one memory to the other. Because light emission of the OLED 10 through the memory of the first capacitor 31 and programming of the memory of the second capacitor 32 are executed in parallel, it is possible to provide a sufficient time for programming and Vth correction.

Also, because the data stored in the memory of the first capacitor 31 is transferred to the memory of the second capacitor 32 using the correction transistor 13 as a source follower circuit, a gray scale voltage Data is transferred without a voltage drop, even though a voltage stored in each the memories may vary.

Figure 18:
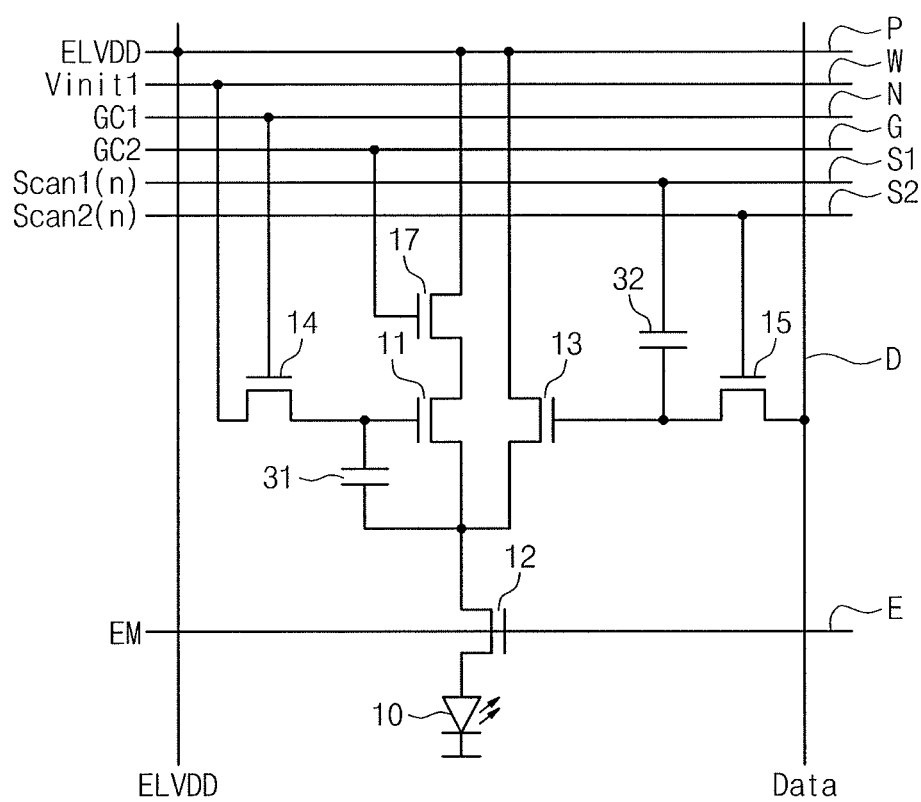
FIG. 18 illustrates another embodiment of a pixel circuit.

FIG. 18 illustrates another embodiment of a pixel circuit, which, for example, may correspond to pixel circuit 1 in FIG. 1. The pixel circuit 1 includes a driving circuit and an OLED, and an optoelectronic device including a plurality of these pixel circuits may corresponding to another embodiment.

This optoelectronic device may be the same as in FIG. 1, except the second initialization transistor 16 has been omitted. Parasitic capacitance of the OLED 10 is not discharged by the second initialization voltage Vinit2, but rather is discharged by the first initialization voltage Vinit1 through capacitive coupling of a first capacitor 31.

Figure 19:
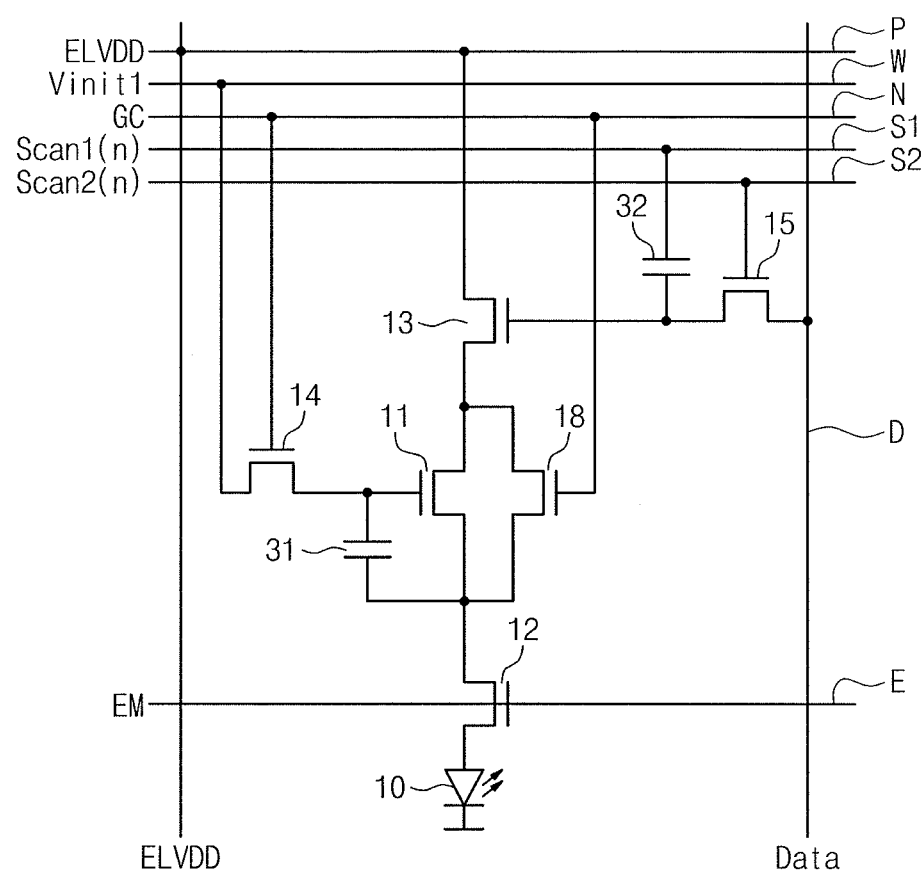
FIG. 19 illustrates another embodiment of a pixel circuit.

FIG. 19 illustrates another embodiment of a pixel circuit, which, for example, may correspond to pixel circuit 1 in FIG. 1. The pixel circuit 1 includes a driving circuit and an OLED, and an optoelectronic device including a plurality of these pixel circuits may corresponding to another embodiment.

This embodiment of the optoelectronic device may be the same as in FIG. 11, except that the second initialization transistor 16 is removed. In this embodiment, parasitic capacitance of the OLED 10 is not discharged by the second initialization voltage Vinit2, but rather is discharged by the first initialization voltage Vinit1 through capacitive coupling of a first capacitor 31.

Also, the second initialization transistor 16 connected to a data line is removed, to reduce the probability of a short circuit between the data line and ELVDD. Thus, it is possible to remove a power blocking transistor 17 for blocking connection with a first power line P at initialization.

Figure 20:
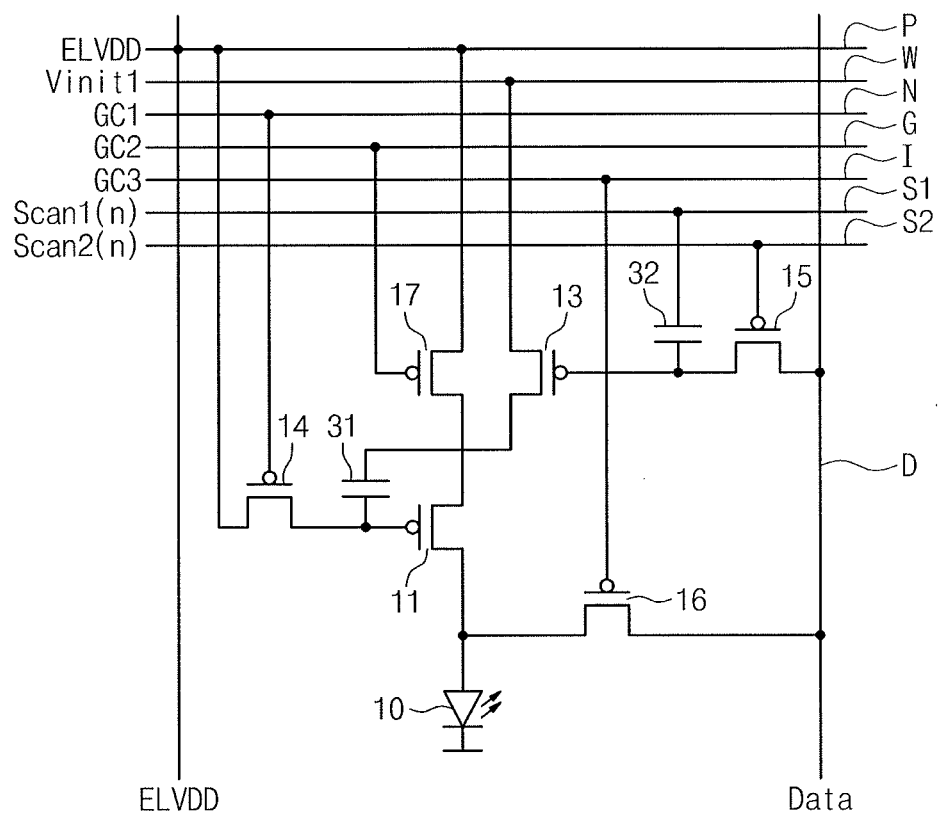
FIG. 20 illustrates another embodiment of a pixel circuit.
Figure 21:
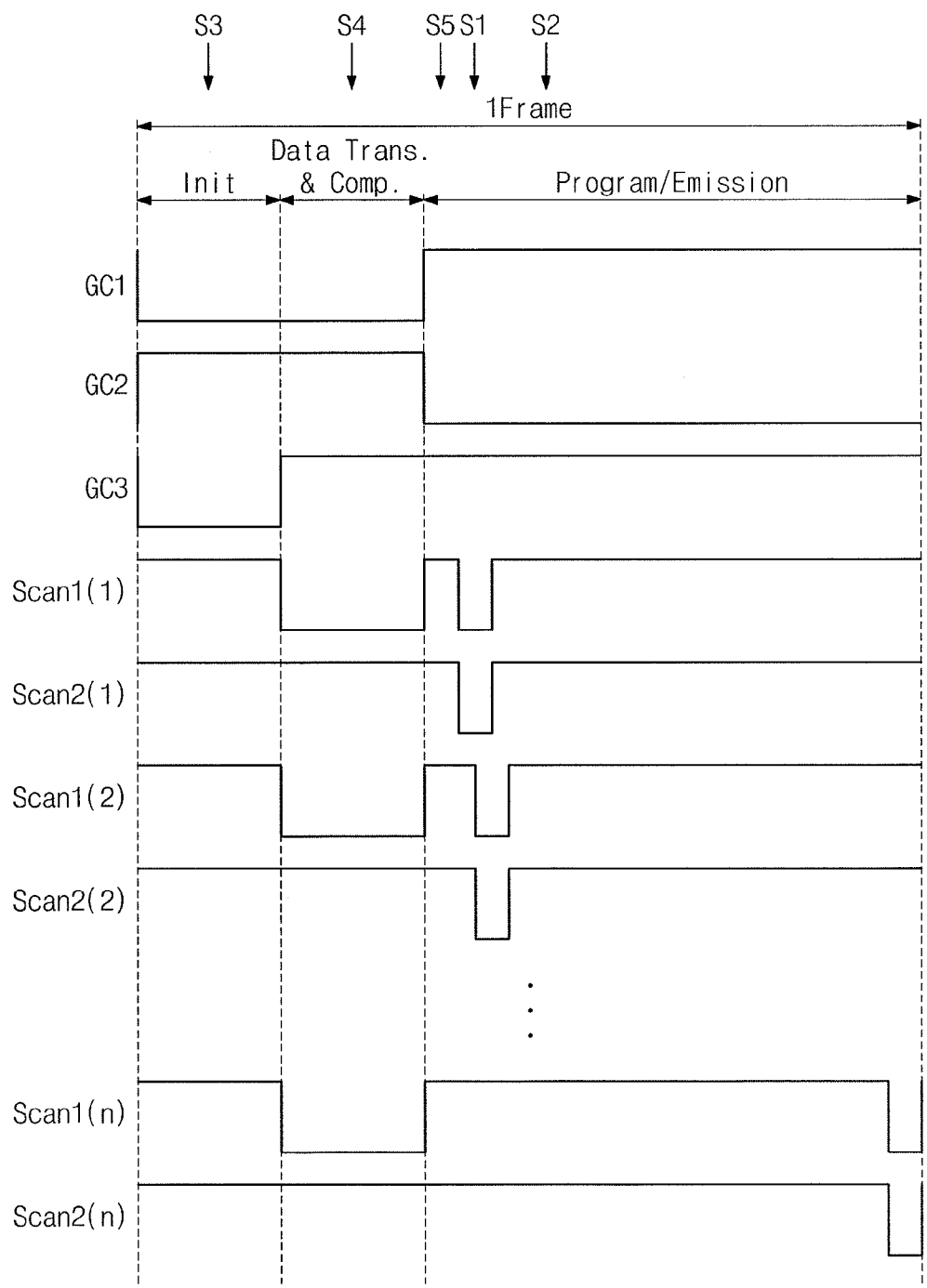
FIG. 21 illustrates an example of control signals for a pixel circuit.

FIG. 20 illustrates another embodiment of a pixel circuit, which, for example, may correspond to pixel circuit 1 in FIG. 1. The pixel circuit 1 includes a driving circuit and an OLED, and an optoelectronic device including a plurality of these pixel circuits may corresponding to another embodiment. FIG. 21 is an example of a timing diagram including signals for controlling the pixel circuit in FIG. 20.

In this embodiment, transistors 11 to 17 are p-channel MOSFETs. Also, the wiring and signal patterns are changed or modified so that the optoelectronic device may be formed to perform the same functions as in FIG. 1. Also, a light-emitting switch transistor 12 is removed.

In FIG. 20, the power blocking transistor 17 (e.g., corresponding to a switch for first current) and the driving transistor 11 are connected in series between the power line P and the anode of the OLED 10. The power blocking transistor driving line G is electrically connected to the gate of the power blocking transistor 17. The gate of the driving transistor 11 is electrically connected to the first power line P via a first initialization transistor 14. The first initialization transistor driving line N is electrically connected to the gate of the first initialization transistor 14.

The first capacitor 31 is connected between the gate and source of the driving transistor 11. A second initialization transistor 16 is connected between the data line D and the connection node between the drain of the driving transistor 11 and the anode of the OLED 10. The correction transistor 13 is electrically connected between the source of the driving transistor 11 and the second power line W. The gate of the second initialization transistor 16 is electrically connected to the second initialization transistor driving line I. The gate of the compensation transistor 13 is connected to the data line D via a scan transistor 15 and to the first scan line S1 via a second capacitor 32. The gate of the scan transistor 15 is connected to the second scan line S2. Because the characteristics of the driving transistor 11 and the compensation transistor 13 are equal to each other, the threshold voltages of the driving transistor 11 and the compensation transistor 13 are equal to each other.

Referring to FIG. 21, the operations therein may be iterated whenever the gray scale voltage generation unit 22 generates a gray scale voltage of a frame unit by a period synchronized with a vertical synchronization signal. The control circuit 2 may output gray scale voltages on all columns of OLEDs 10 in parallel, and may perform a program operation to sequentially output gray scale signals to the driving circuits of the OLEDs 10 on a row-by-row basis.

Afterwards, the control circuit 2 simultaneously performs initialization on all the OLED rows, Vth correction, and transfer of data to the first capacitor 31. The control circuit 2 executes programming on gray scale data of a next frame, to control the OLEDs 10 to emit light according to transmitted data. The following operations may be performed from a point in time when programming on gray scale data of any frame is executed.

At time S1 in FIG. 21, the control circuit 2 sets a potential of a first initialization transistor driving signal GC1 to H (e.g., a first initialization transistor 14 is turned off), a power blocking signal GC2 to L (e.g., a power blocking transistor 17 is turned on), and a potential of a second initialization transistor driving signal GC3 to H (e.g., a second initialization transistor 16 is turned off) with respect to all rows.

With this condition, in the driving circuits of all the OLEDs 10, a first capacitor 31 is floated. Also, the driving transistor 11 supplies current (corresponding to first current) to the OLED 10 according to a voltage Vgs (=ELVDD−Data+Vth, where Vth is a negative value for embodiments using p-channel MOSFETs) that the first capacitor 31 holds according to a gray scale voltage of a previous frame. As a result, the OLED 10 emits light with a luminance corresponding to the gray scale voltage.

At the same time, the control circuit 2 switches potentials of first and second scan signals Scan1 and Scan2 to H (e.g., a scan transistor 15 is turned off) for remaining rows, except for a scan-target row (e.g., a first row at the beginning and switched into a next row sequentially according to a horizontal synchronization signal). Also, the control circuit 2 switches potentials of the first and second scan signals Scan1 and Scan2 to L (e.g., the scan transistor 15 is turned on) with respect to the scan-target row.

At this time, the control circuit 2 supplies a gray scale voltage Data for the OLEDs 10 of the scan-target row to the data line D. The gray scale voltage Data is stored (or, accumulated) in the second capacitor 32. The gray scale voltage Data is applied to the gate of a correction transistor 13. However, because a difference between a gate voltage Data and the source voltage of the correction transistor 13 is set to be greater than Vth, the correction transistor 13 is turned on because the gray scale voltage Data is a minimum value.

At this time, because a second initialization transistor 16 is turned off, overlapping current (corresponding to second current) flows from Vint1 with respect to the OLED 10. However, because a horizontal synchronization period where the correction transistor 13 is turned on is sufficiently shorter than a vertical synchronization period where the OLED 10 continues to emit light, the current (i.e., the overlapping current) may not influence the brightness of the OLED 10 in external appearance. This is because a viewer perceives the brightness of the OLED 10 as an integral value of luminance during the horizontal scan period.

The control circuit 2 performs the above-described programming for all rows as a scan-target row is sequentially changed whenever a horizontal synchronization signal is received. At time S2, when a scan-target row is switched to a next row after programming on any row is performed, That is, if a scan-target row is switched to a next row, the control circuit 2 sets the potentials of the first and second scan signals Scan1 and Scan2 of a row in which programming is completed, to H (e.g., the scan transistor 15 is turned off).

By shifting the amplitude ΔV (=H−L) of the first scan signal Scan1 on the first scan line S1 due to the capacitive coupling of the second capacitor 32, a voltage applied to a gate of the correction transistor 13 is (Data+ΔV). Because a value of the amplitude ΔV is set such that a difference between a gate voltage (Data+ΔV) and the source voltage of the correction transistor 13 is less than Vth even though a gray scale voltage Data is a maximum value, the correction transistor 13 is turned off. In this case, current (corresponding to the second current) flowing from the correction transistor 13 to the OLED 10 is blocked. Thus, the control circuit 2 regulates the second current.

When programming on all rows is completed, at time S3 in FIG. 21, the control circuit 2 switches a voltage supplied to the data line D to the second initialization voltage Vinit2. Simultaneously, the control circuit 2 sets the potentials of the first and second scan signals Scan1 and Scan2 on all rows to H (e.g., the scan transistor 15 is turned off), the potential of the first initialization transistor driving signal GC1 to L (e.g., the first initialization transistor 14 is turned on), the potential of the power blocking signal GC2 to H (e.g., the power blocking transistor 17 is turned off), and a potential of the second initialization transistor driving signal GC3 to L (e.g., the second initialization transistor 16 is turned on).

In this case, the OLED 10 is turned off because current (corresponding to the first current) from ELVDD is blocked by the power blocking transistor 17. Also, the gate potential of the driving transistor 11 is reset to ELVDD, and its drain potential is reset to the second initialization voltage Vinit2. At this time, because the second initialization voltage Vinit2 is set to be less than a threshold voltage of the OLED 10, charge accumulated in the parasitic capacitance of the OLED 10 during light emission of a previous frame is discharged. Thus, when a value of a gray scale voltage Data corresponds to a black value, current flow into the OLED 10 and light-emission are prevented. Also, because the correction transistor 13 and the power blocking transistor 17 are turned off, it is possible to prevent a short circuit between the first power line P and the data line D.

At time S4 in FIG. 21, the control circuit 2 sets the potential of the second initialization transistor driving signal GC3 to H (e.g., the second initialization transistor 16 is turned off) and the potential of the first scan signal Scan1 to L for all rows. By decreasing the amplitude ΔV (=H−L) of the first scan signal Scan1, the gate potential of the correction transistor 13 corresponds to the original gray scale voltage Data.

As described above, even though the gray scale voltage Data is a minimum value, the correction transistor 13 is turned on because a difference between a gate voltage Data and a source voltage of the correction transistor 13 is set to become greater than Vth. In this case, the correction transistor 13 operates as a source follower circuit, and current from ELVDD flows through the first initialization transistor 14, the first capacitor 31, a source voltage of the driving transistor 11, and the correction transistor 13. Also, the source voltage of the correction transistor 13 becomes (Data−Vth). At this time, a gate-source voltage Vgs (=ELVDD−Data+Vth) of the driving transistor 11 is held in the first capacitor 31.

At time S5 in FIG. 21, the control circuit 2 sets the potential of the first initialization transistor driving signal GC1 to H (e.g., the first initialization transistor 14 is turned off), the potential of the power blocking signal GC2 to L (e.g., the power blocking transistor 17 is turned on), and the potential of the first scan signal Scan1 to H for all rows.

With this condition, in the driving circuits of all the OLEDs 10, the correction transistor 13 is turned off and the first capacitor 31 is floated. Also, current (corresponding to the first current) proportional to a voltage (ELVDD−Data), dropped by a threshold voltage Vth from a voltage Vgs (=ELVDD−Data+Vth) held in the first capacitor 31, flows between the source and drain of the driving transistor 11 so that the OLED 10 emits light. The luminance of the OLED 10 depends on the gray scale voltage Data.

Afterwards, control circuit 2 controls the OLED 10 to continue to emit light until period S2 ends. Also, the control circuit 2 executes a process following time S1 to receive a next gray scale voltage.

Figure 22:
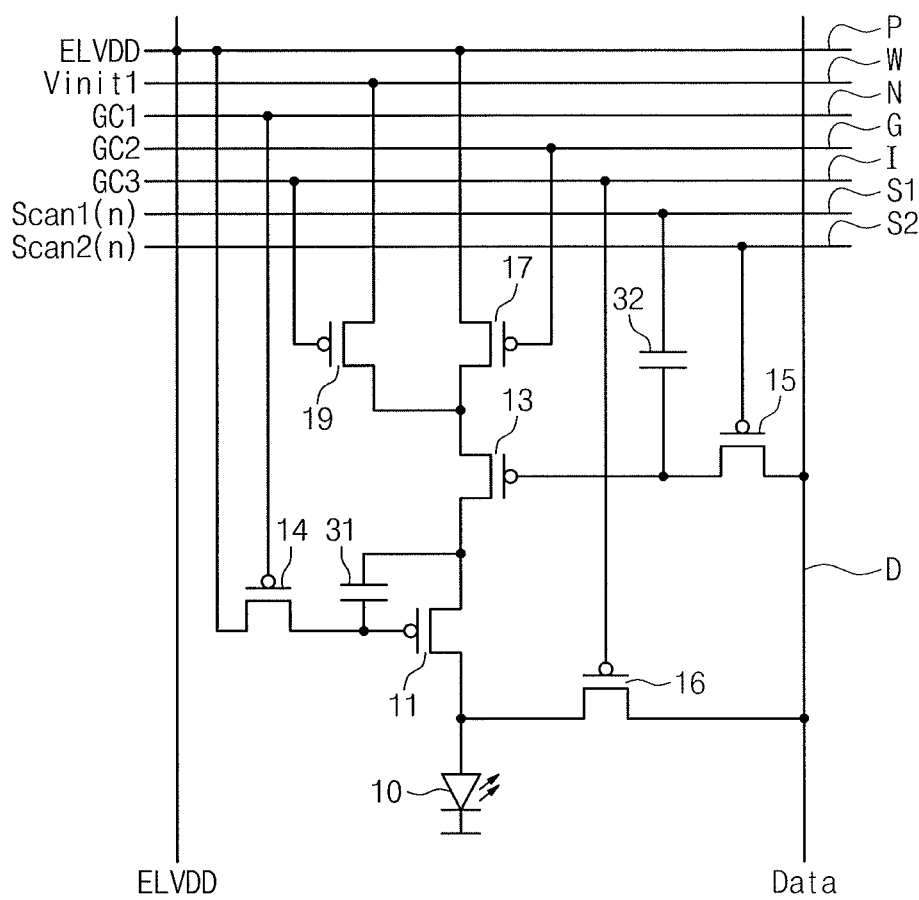
FIG. 22 illustrates another embodiment of a pixel circuit.
Figure 23:
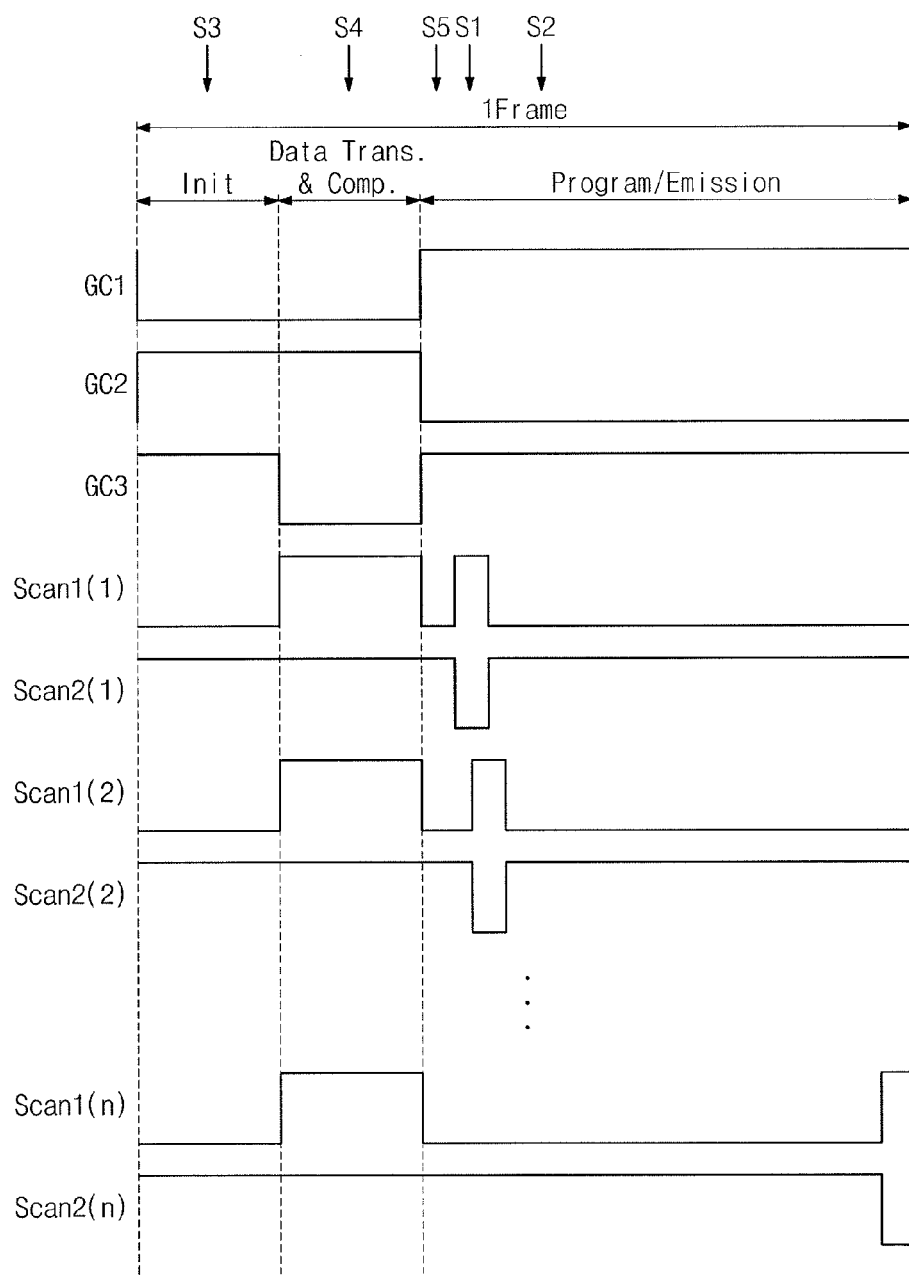
FIG. 23 illustrates an example of control signals for controlling a pixel circuit.

FIG. 22 illustrates another embodiment of a pixel circuit, FIG. 23 is an example of a timing diagram for this pixel circuit, and FIGS. 24-28 illustrate operation states in accordance with this timing diagram. Here, transistors 11 to 17 are p-channel MOSFETs. Also, the wiring and signal patterns may be changed or modified so that an optoelectronic device according to the this embodiment performs the same functions as in FIG. 11. Also, in this embodiment, the light-emitting switch transistor 12 and the bypass transistor 18 are omitted, and the ground transistor 19 is provided such that current flows to the second power line W.

In FIG. 22, the power blocking transistor 17 (e.g., corresponding to a switch for first current), the correction transistor 13, and the driving transistor 11 are connected in series between the first power line P and the anode of the OLED 10. The power blocking transistor driving line G is electrically connected to the gate of the power blocking transistor 17. The gate of the driving transistor 11 is electrically connected to the first power line P via a first initialization transistor 14. The first initialization transistor driving line N is electrically connected to the gate of the first initialization transistor 14.

The first capacitor 31 is connected between the source and gate of the driving transistor 11. The second initialization transistor 16 is connected between the data line D and the connection node between the drain of the driving transistor 11 and the anode of the OLED 10. The gate of the second initialization transistor 16 is electrically connected to the second initialization transistor driving line I. The gate of the compensation transistor 13 is connected to the data line D via a scan transistor 15 and to the first scan line S1 via a second capacitor 32. The gate of the scan transistor 15 is connected to the second scan line S2.

To regulate second current, the ground transistor 19 (e.g., corresponding to switch for second current) is connected between the second power line W and the connection node between the drain of the power blocking transistor 17 and the source of the correction transistor 13. The gate of the ground transistor 19 is connected to the second initialization transistor driving line I. The characteristics of the driving transistor 11 and the compensation transistor 13 may be equal to each other. Therefore, the threshold voltages of the driving transistor 11 and the compensation transistor 13 may be equal to each other.

Referring to FIGS. 24 to 28, the operations illustrated therein may be iterated whenever a gray scale voltage generation unit 22 generates a gray scale voltage of a frame unit in a period synchronized with a vertical synchronization signal. The control circuit 2 may output gray scale voltages on all columns of the OLEDs 10 in parallel, and may perform a program operation where gray scale signals sequentially output are provided to the driving circuits of the OLEDs 10 on a row-by-row basis.

Afterwards, the control circuit 2 simultaneously performs initialization on all OLED rows, Vth correction, and transfer of data to the first capacitor 31. The control circuit 2 executes programming on gray scale data of a next frame, to control the OLEDs 10 to emit light according to transmitted data. The following operations are described from a point in time when programming on gray scale data of any frame is executed.

Figure 24:
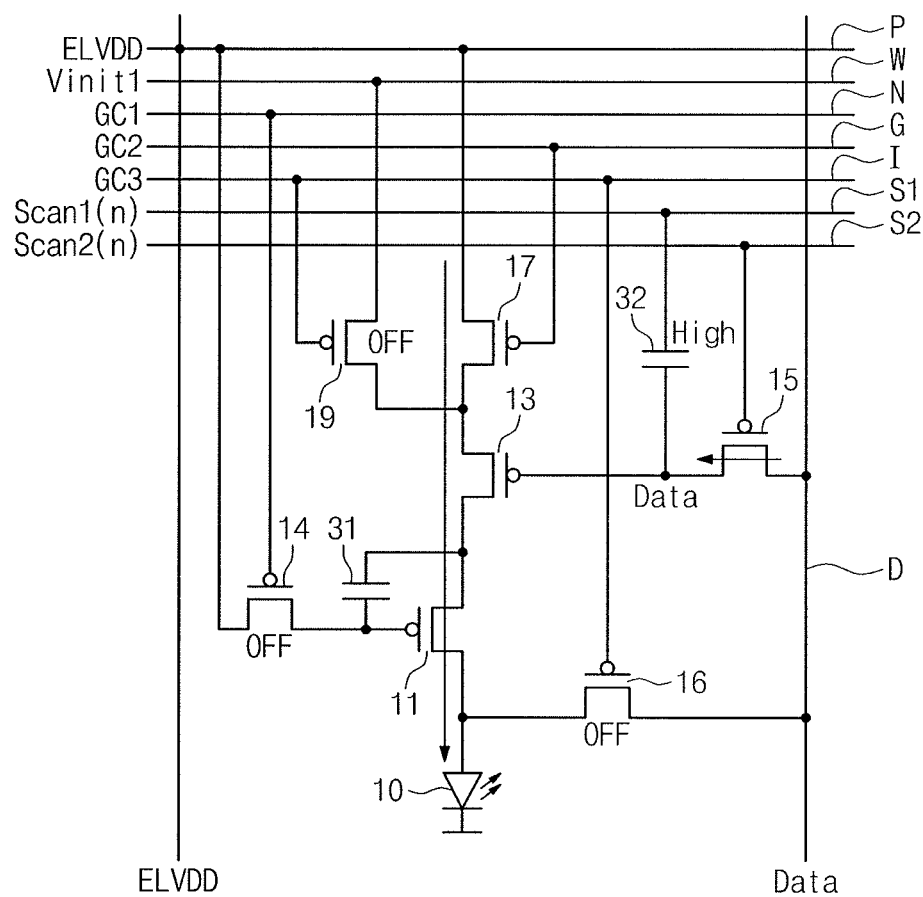
FIG. 24 illustrates an example of an operating state of the pixel circuit.

At time S1 in FIG. 23, the control circuit 2 sets the potential of a first initialization transistor driving signal GC1 to H (e.g., the first initialization transistor 14 is turned off), the power blocking signal GC2 to L (e.g., the power blocking transistor 17 is turned on), and the potential of a second initialization transistor driving signal GC3 to H (e.g., the second initialization transistor 16 is turned off and the ground transistor 19 is turned off) for all rows (refer to FIG. 24).

With this condition, in the driving circuits of all OLEDs 10, the first capacitor 31 is floated and the driving transistor 11 supplies current (corresponding to first current) to the OLED 10 according to a voltage Vgs (=ELVDD−Data+Vth) that the first capacitor 31 holds according to a gray scale voltage of a previous frame. As a result, the OLED 10 emits light with a luminance corresponding to the gray scale voltage.

At the same time, the control circuit 2 switches potentials of the first and second scan signals Scan1 and Scan2 to L and H (e.g., the scan transistor 15 is turned off) for remaining rows except for a scan-target row (e.g., a first row at the beginning and switched into a next row sequentially according to a horizontal synchronization signal). The control circuit also switches potentials of the first and second scan signals Scan1 and Scan2 to H and L (e.g., the scan transistor 15 is turned on) for the scan-target row (refer to FIG. 24).

At this time, the control circuit 2 supplies a gray scale voltage Data for the OLEDs 10 of the scan-target row to the data line D. The gray scale voltage Data is stored (or, accumulated) in the second capacitor 32. The gray scale voltage Data is applied to a gate of a correction transistor 13. However, because the difference between the gate voltage Data and the source voltage of the correction transistor 13 is set to be greater than Vth, the correction transistor 13 is turned, on even though the gray scale voltage Data is a minimum value.

At this time, the intensity of current (corresponding to first current) supplied to the OLED 10 through the correction transistor 13 depends on a gray scale voltage Data held in the second capacitor 32. However, because the horizontal synchronization period is sufficiently shorter than the vertical synchronization period where the OLED 10 continues to emit light, the current does not influence the brightness of the OLED 10 in external appearance. This is because a viewer perceives the brightness of the OLED 10 as an integral value of luminance during the horizontal scan period.

The control circuit 2 performs the above-described programming for all rows as a scan-target row is sequentially changed whenever a horizontal synchronization signal is received.

Figure 25:
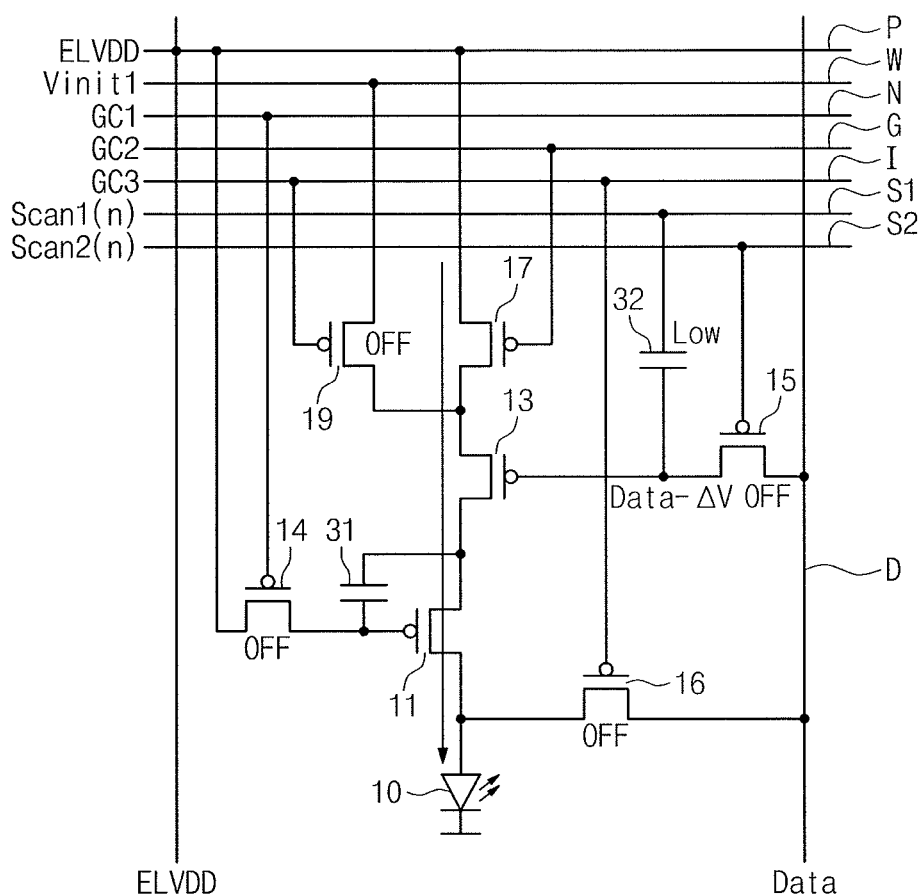
FIG. 25 illustrates an example of another operating state of the pixel circuit.
Figure 26:
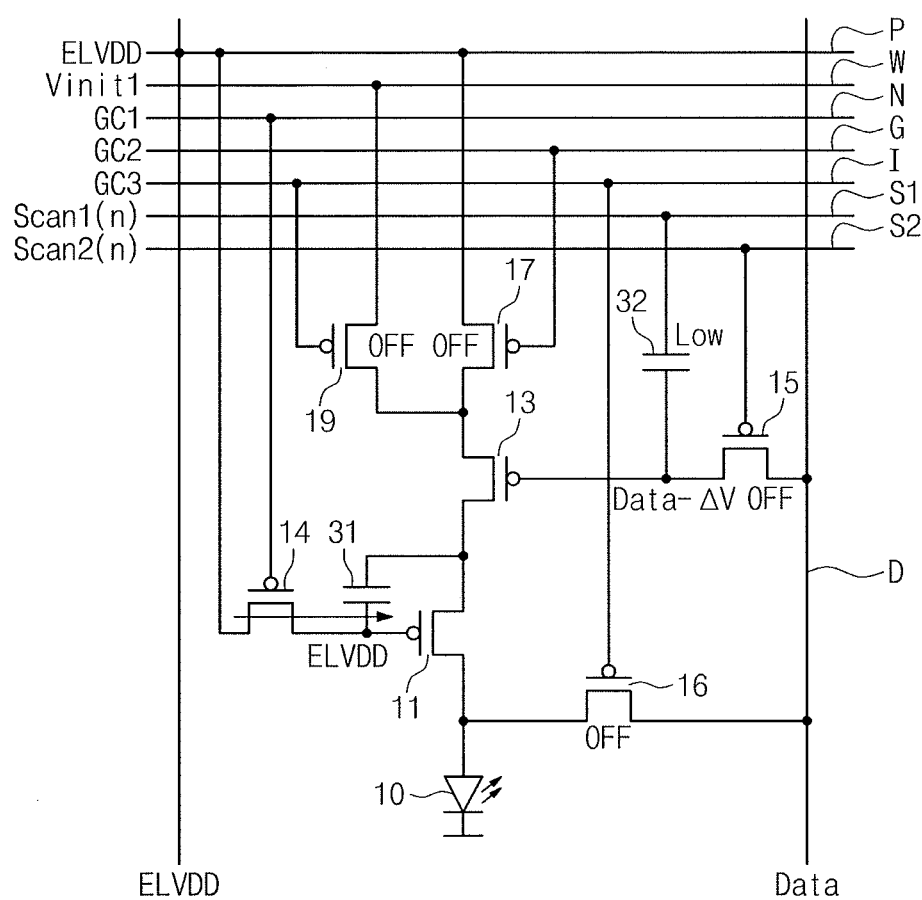
FIG. 26 illustrates an example of another operating state of the pixel circuit.

FIG. 25 illustrates an operation state of the driving circuit at time S2 when a scan-target row is switched to a next row, after programming on any row is performed. For example, when the scan-target row is switched to a next row, the control circuit 2 sets the potentials of the first scan signal Scan1 and the second scan signal Scan2, of a row in which programming is completed, to L and H, respectively (e.g., the scan transistor 15 is turned off).

By decreasing the amplitude $\Delta V$ (=H−L) of the first scan signal Scant on the first scan line S1 due to the capacitive coupling of the second capacitor 32, the voltage applied to the gate of the correction transistor 13 is (Data−$\Delta V$). Because the value of the amplitude $\Delta V$ is set to be sufficiently greater than a maximum value of a gray scale voltage Data, the source-drain impedance of the correction transistor 13 approximates to a minimum value, current supplied to the OLED 10 is completely controlled by the driving transistor 11, and the OLED 10 resumes light-emitting with a luminance corresponding to a voltage Vgs (=ELVDD−Data+Vth) held in the first capacitor 31. Thus, the control circuit 2 regulates the second current.

When programming on all rows is completed, at time S3 in FIG. 23, the control circuit 2 switches a voltage supplied to the data line D to the second initialization voltage Vinit2. Simultaneously, the control circuit 2 sets the potential of the first initialization transistor driving signal GC1 to L (e.g., the first initialization transistor 14 is turned on) and the potential of the power blocking signal GC2 to H (e.g., the power blocking transistor 17 is turned off) (refer to FIG. 26).

In this case, the OLED 10 is turned off because current (corresponding to the first current) from ELVDD is blocked by the power blocking transistor 17. Also, the gate potential of the driving transistor 11 is reset to ELVDD. Also, because the power blocking transistor 17 is turned off, it is possible to prevent a short circuit between the first power line P and the data line D.

Figure 27:
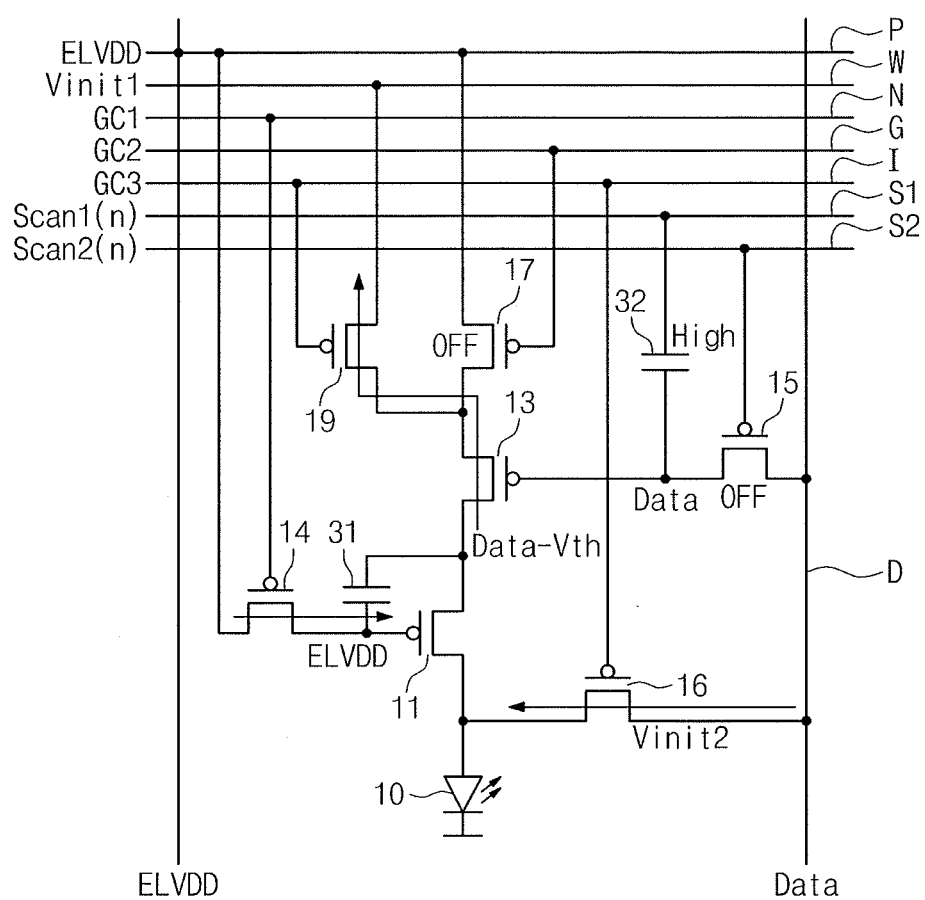
FIG. 27 illustrates an example of another operating state of the pixel circuit.

At time S4 in FIG. 24, the control circuit 2 sets the potential of the second initialization transistor driving signal GC3 to L (e.g., the second initialization transistor 16 is turned on and the ground transistor 19 is turned on) and the potential of the first scan signal Scan1 to H for all rows (refer to FIG. 27).

At this time, because the first initialization transistor 14 is turned on, the voltage applied to the gate of the driving transistor 11 is ELVDD and the driving transistor 11 is turned off. In this case, because the ground transistor 19 is turned on, current from ELVDD flows through the first initialization transistor 14, the first capacitor 31, a source of the driving transistor 11, the correction transistor 13, and the ground transistor 19. Also, by increasing the amplitude $\Delta V$ (=H−L) of the first scan signal Scan1 at this time, the gate potential of the correction transistor 13 corresponds to the original gray scale voltage Data.

Therefore, the correction transistor 13 functions as a source follower circuit and the source potential of the correction transistor 13 is a voltage (Data−Vth). Also, the gate-source voltage Vgs (=ELVDD−Data+Vth) of the driving transistor 11 is held in the first capacitor 31. At the same time, the gate potential of the driving transistor 11 is reset to the second initialization voltage Vinit2, and charge accumulated in the parasitic capacitance of the OLED 10 during light-emitting of a previous frame is discharged. Thus, when a value of a gray scale voltage Data corresponds to a black value, current flow into the OLED 10 and light-emitting are prevented.

Figure 28:
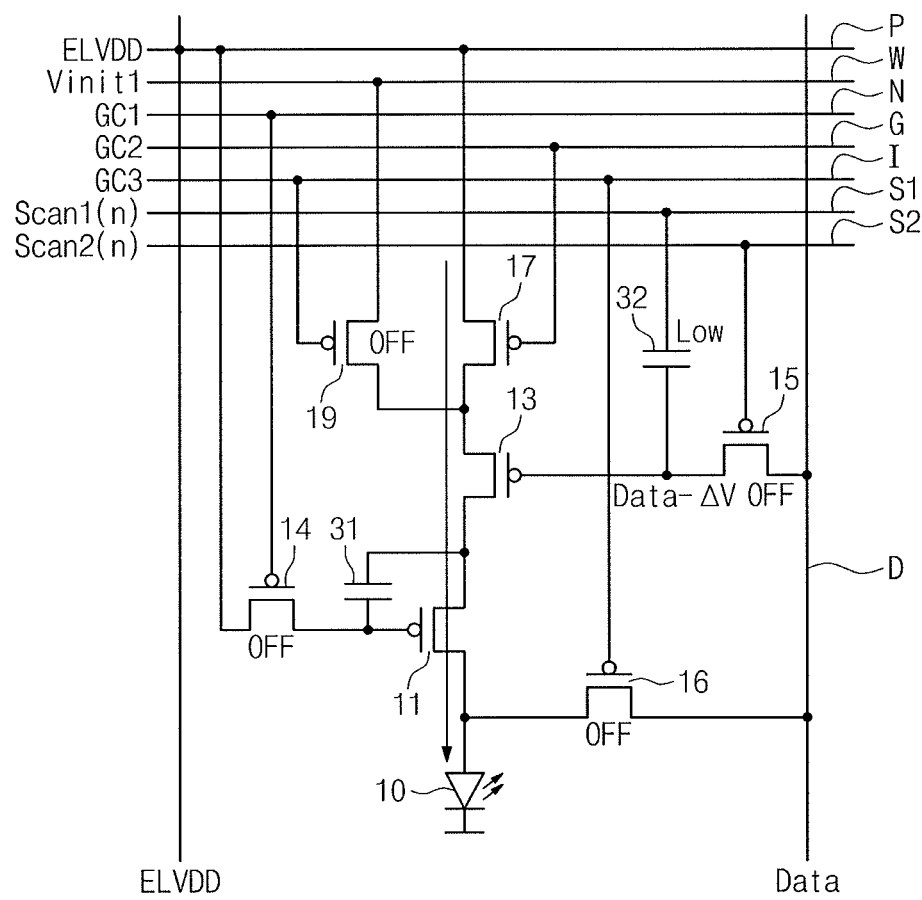
FIG. 28 illustrates an example of another operating state of the pixel circuit.

At time S5 in FIG. 23, the control circuit 2 sets the potential of the first initialization transistor driving signal GC1 to H (e.g., the first initialization transistor 14 is turned off), the potential of the power blocking signal GC2 to L (e.g., the power blocking transistor 17 is turned on), the potential of the second initialization transistor driving signal GC3 to H (e.g., the second initialization transistor 16 is turned off and the ground transistor 19 is turned off), and the potential of the first scan signal Scan1 to L for all rows (refer to FIG. 28).

With this condition, in the driving circuits of all the OLEDs 10, the first capacitor 31 is floated, and current (corresponding to the first current) proportional to a voltage (ELVDD−Data), dropped by a threshold voltage Vth from a voltage Vgs (=ELVDD−Data+Vth) held in the first capacitor 31, flows through the driving transistor 11 so that the OLED 10 emits light. The luminance of the OLED 10 therefore depends on the gray scale voltage Data.

Afterwards, the control circuit 2 controls the OLED 10 to continue to emit light until the period S2 ends. Also, the control circuit 2 executes a process following time S1 to receive a next gray scale voltage.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

By way of summation and review, the driving transistors in an optoelectronic device have threshold voltages that are irregular. This irregularity causes the luminance of light emitted from the pixels to vary for the same gray scale voltages. As a result, the performance of the optoelectronic device is adversely affected.

Various approaches have been taken in an attempt to correct this irregularity. One approach involves supplying current of an intensity proportional to a gray scale voltage to an OLED, regardless of the non-uniformity of the threshold voltages. This is performed by reflecting the non-uniformity of the threshold voltages of the driving transistors to voltages Vgs applied between the gate and source of the driving transistors based on the gray scale voltage.

According to this approach for correcting (or compensating) the threshold voltage of the driving transistor, a capacitor for holding the voltage Vgs is connected between the gate and source of the driving transistor and a voltage corresponding to the threshold voltage Vth at the capacitor is provided for overlapping with gray scale data (data input), prior to a period where the driving transistor supplies current to an OLED. Thus, a period in which Vth correction and data input are performed and a period in which the OLED emits light must be continuing with respect to each OLED.

According to another approach, images are displayed in an interlaced or progressive manner, and Vth correction and data input for the OLEDs of different colors in a display-target row are executed at the beginning of each horizontal scan period. This approach, however, has drawbacks.

For example, when the frame rate increased for a display with increased resolution or to improve display performance of moving picture, a 1-horizontal scan period becomes short. In this case, it is impossible to secure sufficient time to perform the Vth correction and data input. As a result, the luminance of an image is changed.

Figure 29:
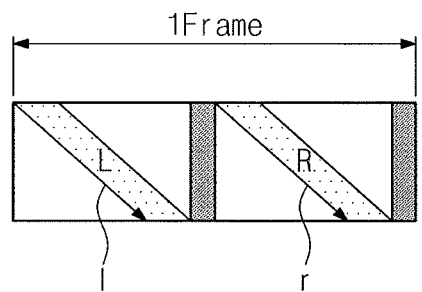
FIG. 29 illustrates a related-art example of progressively driving a three-dimensional display in a frame-sequential manner.

FIG. 29 illustrates the case in which a three-dimensional display is controlled in a frame-sequential manner. In FIG. 29, the display must be turned off throughout a transition period where left-eye and right-eye shutters are simultaneously opened and closed, in order to prevent crosstalk.

Also, in this frame-sequential driving technique, through interworking between liquid crystal shutter glasses and the display, a right-eye image is expressed on the display while a field of vision for the left eye is blocked. Also, a left-eye image is expressed on the display while a field of vision for the right eye is blocked.

Also, in FIG. 29, the abscissa corresponds to an elapsed time and the ordinate corresponds to a row of a display. The portion marked by a dark color indicates a transition period where left-eye and right-eye shutters are simultaneously opened and closed. The arrow I indicates a timing when Vth correction and data input begin with respect to OLEDs of each row to display a left-eye image. The period L marked by dots indicates a light-emitting period of each row where a left-eye image is displayed.

End points of light-emitting periods are dislocated (or, not matched) in rows, so that brightness is not changed on the whole screen by making light-emitting times of respective rows uniform. The arrow r indicates a timing when the Vth correction and the data input begin with respect to OLEDs of each row to display a right-eye image. The period R marked by dots indicates a light-emitting period of each row where a right-eye image is displayed.

In this approach, the time when Vth correction and data input are performed becomes shorter. When the light-emitting time is reduced, the luminance of light emitted from the OLED may be increased to improve brightness of an image in external appearance. But, when a large amount of current is instantly supplied to the OLED, the life time of the OLED is shortened.

According to another approach, a simultaneous light-emitting driving method is applied, where images of all rows are displayed at the same time. Also, Vth correction and data input for all rows are executed before an image is displayed. This approach, however, has drawbacks.

For example, in performing Vth correction and data input for simultaneous light-emitting driving, Vth correction is performed for all pixel circuits at the same time. Because the time for the Vth correction is increased, it is possible to somewhat secure a horizontal scan period where data input is performed for each row. By performing Vth correction in this manner, even though a three-dimensional image is frame sequentially displayed, it is possible to perform Vth correction during a period where left and right shutters are closed at the same time. Otherwise, as illustrated in FIG. 30, the data input is performed during a non-light-emitting period, even in Vth correction and data input for simultaneous light-emitting driving.

Figure 30:
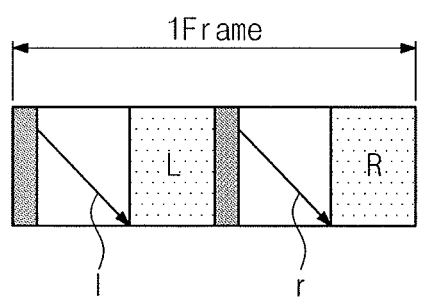
FIG. 30 illustrates a related-art example of simultaneously driving a three-dimensional display in a frame-sequential manner.

In FIG. 30, the abscissa corresponds to an elapsed time and the ordinate corresponds to a row of a display. The portion marked by a dark color indicates a transition period left-eye and right-eye shutters are simultaneously opened and closed. The arrow I indicates a timing when the Vth correction and the data input begin with respect to OLEDs of each row to display a left-eye image (thus, the Vth correction and the data input on some rows begin during the transition period).

The period L marked by dots indicates a light-emitting period of each row where a left-eye image is displayed. The arrow r indicates a timing when the Vth correction and the data input begin with respect to OLEDs of each row to display a right-eye image. The period R marked by dots indicates a light-emitting period of each row where a right-eye image is displayed. The problem with Vth correction and data input for simultaneous light-emitting driving is that a data input period or a light-emitting period is short.

In accordance with one or more of the aforementioned embodiments, Vth correction and input of gray scale data for a next image may be performed during OLED light-emitting. It is therefore possible to secure a sufficient period for Vth correction and data input and a light-emitting period.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. An optoelectronic device, comprising:
a driving transistor electrically connected between a power supply and an electrode of a light-emitting element, the driving transistor to adjust a first current from the power supply based on a voltage stored in a first capacitor, the first capacitor connected between a gate and a source of the driving transistor, the driving transistor to supply the adjusted first current to the light-emitting element;
a correction transistor electrically connected on a path of a second current flowing from the power supply to the first capacitor, the correction transistor to adjust an intensity of the second current based on a voltage stored in a second capacitor; and
a control circuit to control the second capacitor to store a gray scale voltage while the first current flows, and to control flow of the second current to update the voltage stored in the first capacitor while the first current is blocked.

2. The device as claimed in claim 1, wherein the second current is to pass through the source of the driving transistor without passing through the driving transistor.

3. The device as claimed in claim 1, further comprising:
a first switch to open and close a path of the first current,
wherein the control circuit is to control the first switch.

4. The device as claimed in claim 3, further comprising:
a regulator to regulate the second current,
wherein the control circuit controls the regulator to block the second current while the first current flows.

5. The device as claimed in claim 4, wherein the control circuit is to adjust a potential of an electrode of the second capacitor connected to the correction transistor to turn off the correction transistor.

6. The device as claimed in claim 4, wherein the regulator includes a second switch to open and close a path of the second current.

7. The device as claimed in claim 1, wherein the correction transistor is at a location spaced from a path of the first current.

8. The device as claimed in claim 1, wherein the correction transistor is electrically connected on the path of the first current.

9. The optoelectronic device as claimed in claim 8, further comprising:
a second switch connected in parallel with the driving transistor, the second switch to bypass and regulate the second current, wherein:
the first and second currents flow through the correction transistor in a same direction,
the control circuit is to control the second switch to block the second current while the first current flows based on control of the first switch, and is to control the second switch to control the second current to flow while the first current is blocked through a control of the first switch.

10. The device as claimed in claim 8, further comprising:
a second switch spaced from the path of the first current, the second switch to regulate the second current, wherein:
the first and second currents flow through the correction transistor in opposite directions,
the control circuit is to control the second switch to block the second current while the first current flows through control of the first switch, and is to control the second switch for the second current to flow while the first current is blocked through control of the first switch.

11. The device as claimed in claim 10, wherein, in a period in which the first current flows through control of the first switch, the control circuit is to:
adjust a potential of a first electrode opposite to a second electrode of the second capacitor connected to the correction transistor in a remaining period except for a period where a gray scale voltage is stored in the second capacitor, the adjusted potential to reduce source-drain impedance of the correction transistor, and
restore a potential of the first electrode when the second current flows through a control of the second switch.

12. The device as claimed in claim 1, wherein the control circuit is to initialize the first capacitor after the first current is blocked and before the second current flows.

13. An optoelectronic device, comprising:
a driving transistor to adjust a first current from a power line based on a voltage stored in a first capacitor, the driving transistor to supply the adjusted first current to a light-emitting element;
a correction transistor to adjust a second current based on a voltage stored in a second capacitor, the second current flowing from the power line to the first capacitor, and
a control circuit to control the second capacitor to store a gray scale voltage while the first current flows, and to control flow of the second current to update the voltage stored in the first capacitor while the first current is blocked.

14. The device as claimed in claim 13, wherein the second current is to pass through the source of the driving transistor without passing through the driving transistor.

15. The device as claimed in claim 13, further comprising:
a first switch to open and close a path of the first current.

16. The device as claimed in claim 15, further comprising:
a regulator to regulate the second current,
wherein the control circuit controls the regulator to block the second current while the first current flows.

17. The device as claimed in claim 16, wherein the control circuit is to adjust a potential of an electrode of the second capacitor connected to the correction transistor, to turn off the correction transistor.

18. The device as claimed in claim 16, wherein the regulator includes a second switch to open and close a path of the second current.

19. The device as claimed in claim 13, wherein the correction transistor is at a location spaced from a path of the first current.

20. The device as claimed in claim 13, wherein the correction transistor is electrically connected on the path of the first current.

* * * * *